United States Patent
You

(10) Patent No.: US 7,279,383 B2
(45) Date of Patent: Oct. 9, 2007

(54) LIQUID CRYSTAL DISPLAY DEVICE AND METHOD OF FABRICATING THE SAME

(75) Inventor: JaeSung You, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 56 days.

(21) Appl. No.: 10/875,308

(22) Filed: Jun. 25, 2004

(65) Prior Publication Data
US 2004/0263703 A1 Dec. 30, 2004

(30) Foreign Application Priority Data
Jun. 30, 2003 (KR) .................. 10-2003-0043804

(51) Int. Cl.
*H01L 21/8242* (2006.01)
(52) U.S. Cl. .................. 438/254; 438/482; 438/486; 438/488; 438/924
(58) Field of Classification Search .................. None
See application file for complete search history.

(56) References Cited

U.S. PATENT DOCUMENTS 5,952,694 A * 9/1999 Miyawaki et al. .......... 257/347
6,916,693 B2 * 7/2005 Ohnuma et al. ............ 438/162
6,962,860 B2 * 11/2005 Yamazaki et al. .......... 438/487

FOREIGN PATENT DOCUMENTS

| CN | 1088002 A | 6/1994 |
|---|---|---|
| CN | 1501449 A | 6/2004 |

\* cited by examiner

*Primary Examiner*—Wai-Sing Louie
(74) *Attorney, Agent, or Firm*—McKenna Long & Aldridge LLP

(57) ABSTRACT

There is disclosed a liquid crystal display device and a fabricating method thereof that reduce the number of processes and production cost. A liquid crystal display device and a fabricating method thereof according to an embodiment of the present invention forms a poly-silicon pattern by partially crystallizing an amorphous silicon, and simultaneously etches the amorphous silicon and the poly-silicon pattern, thereby removing the amorphous silicon and leaving the poly-silicon pattern on the substrate.

13 Claims, 31 Drawing Sheets

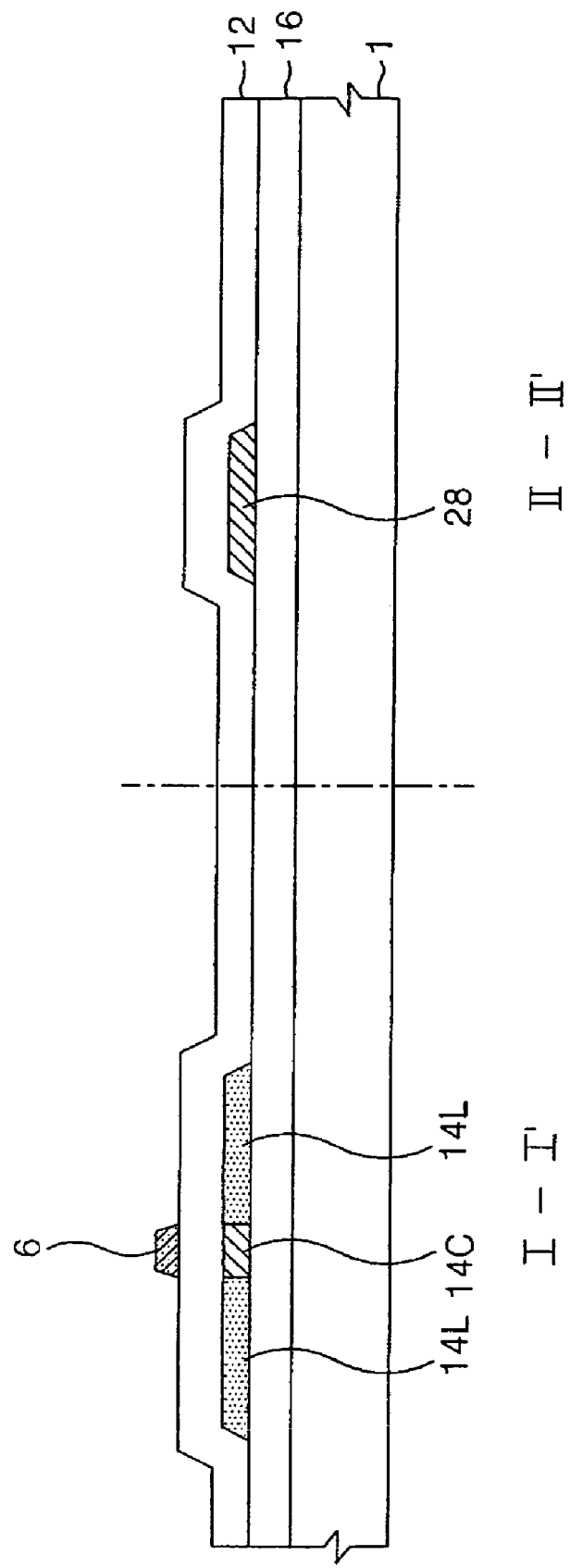

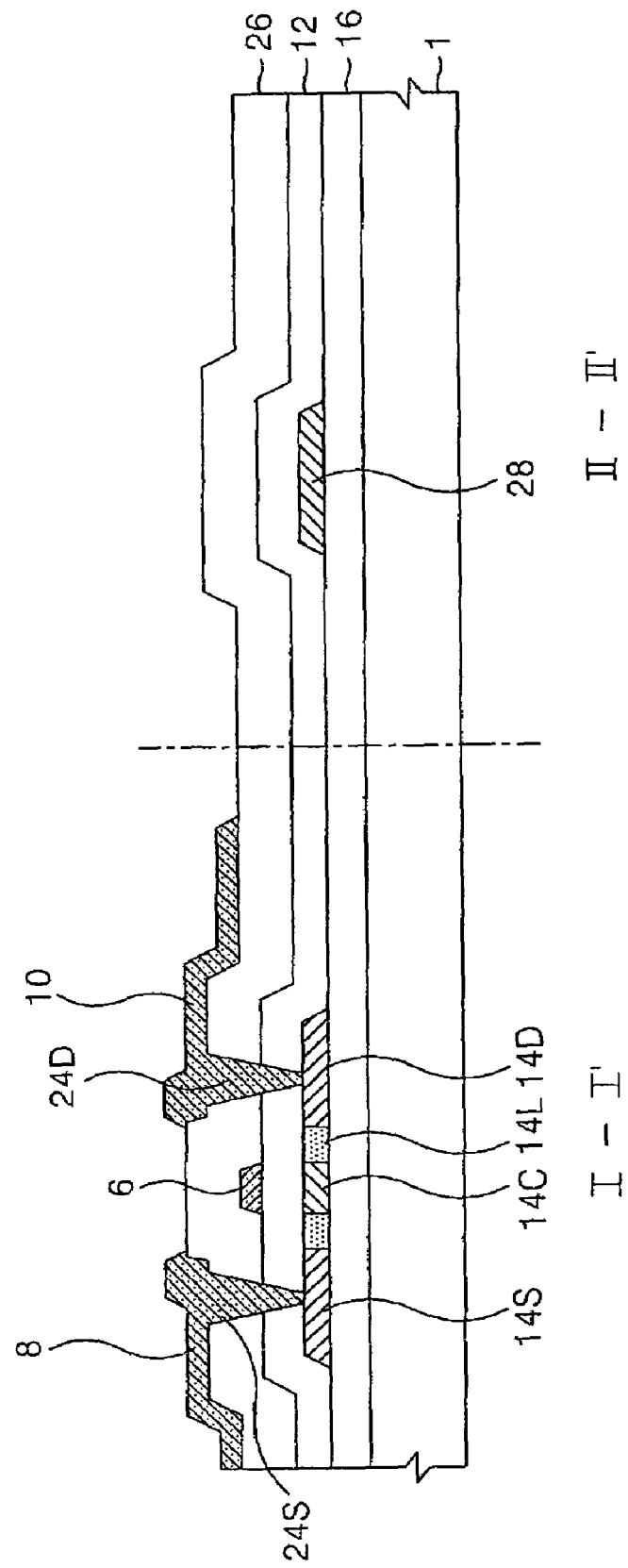

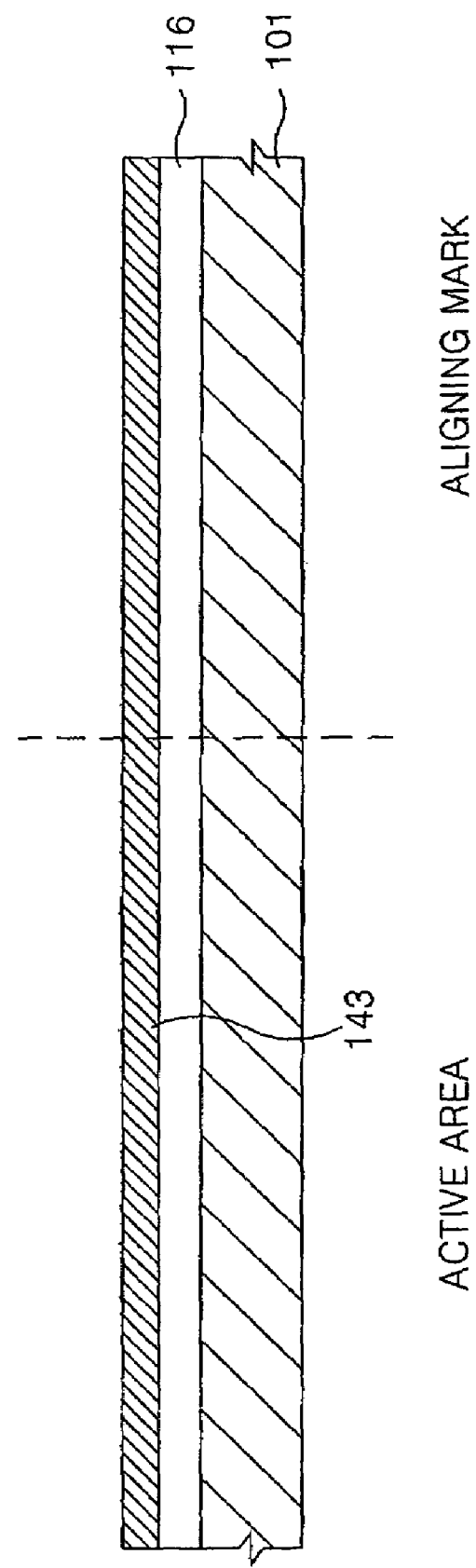

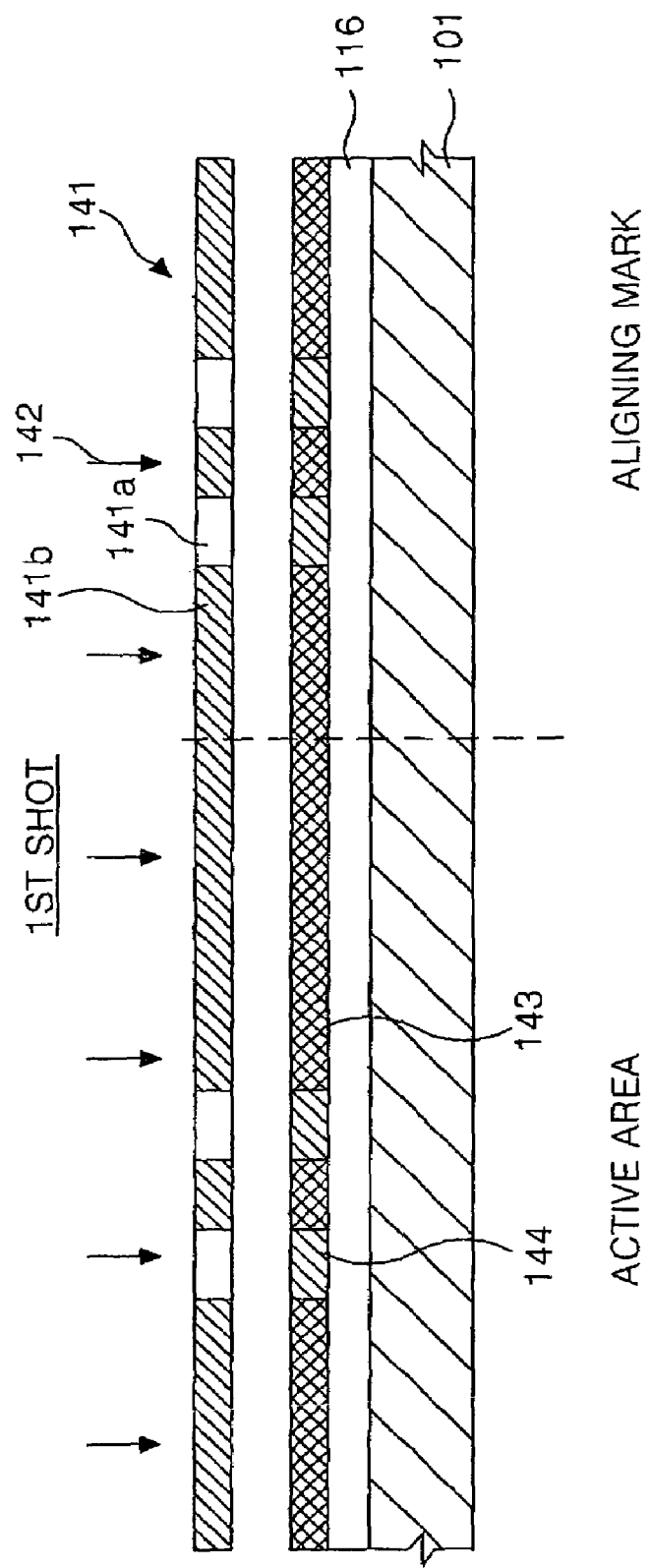

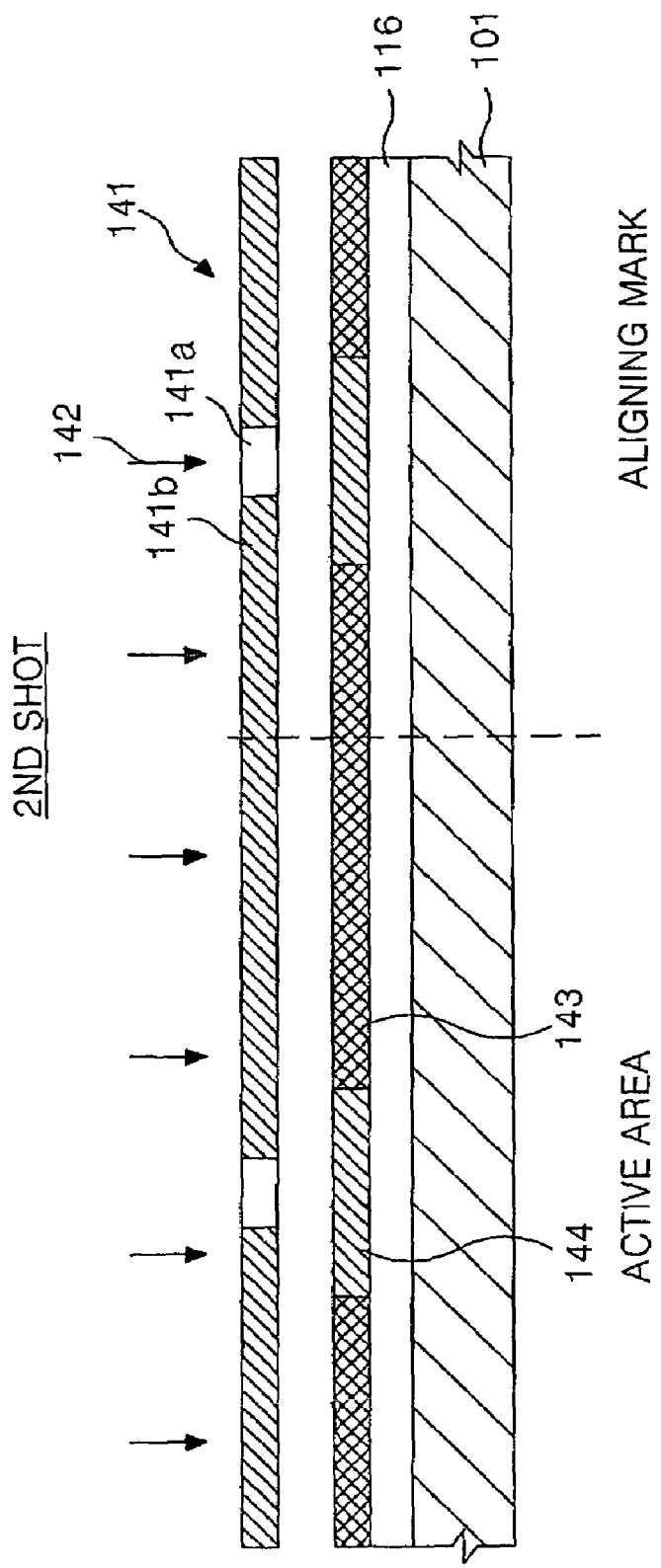

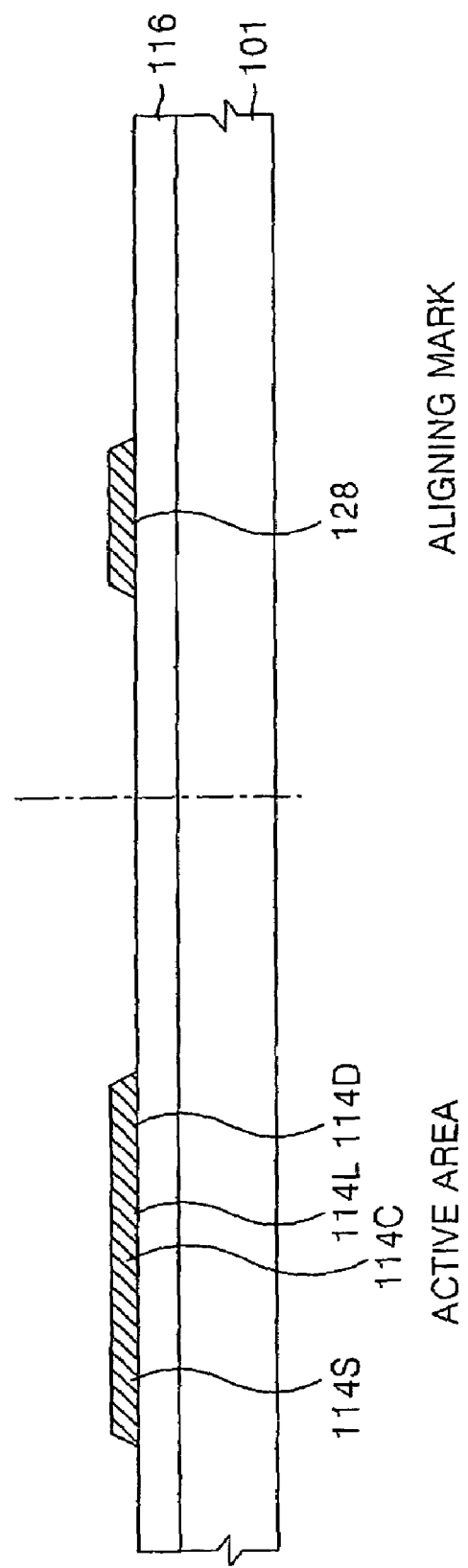

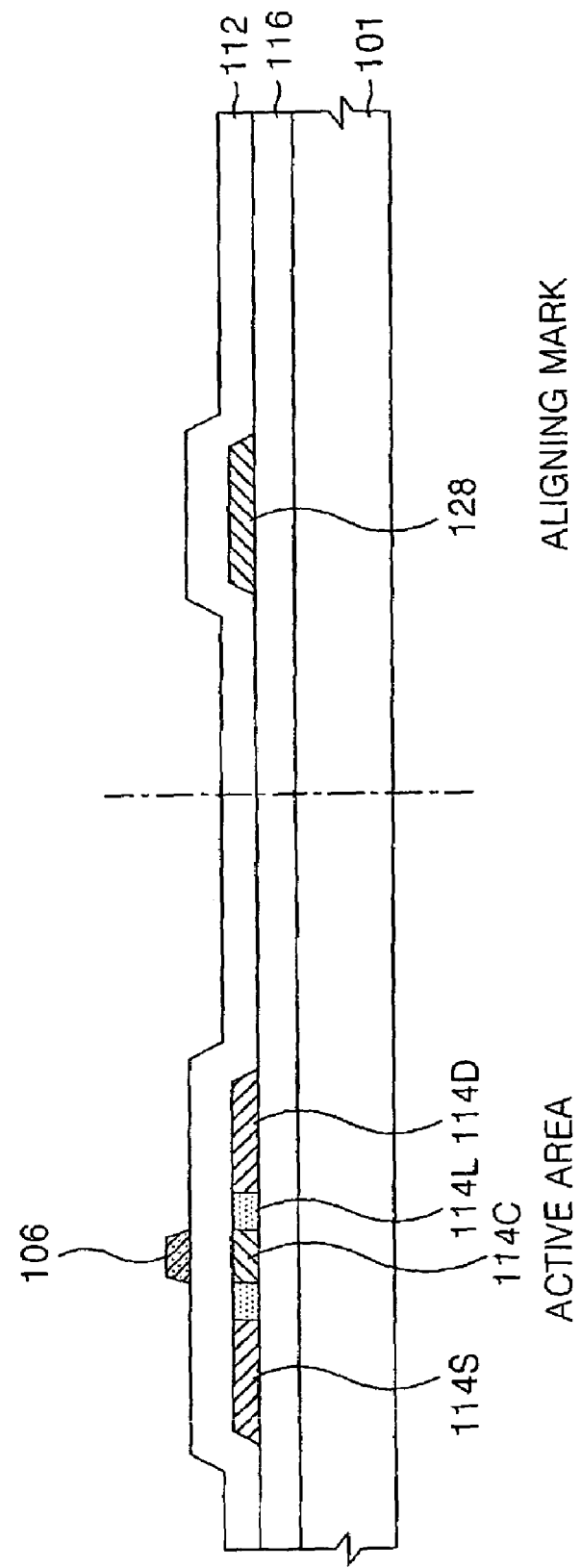

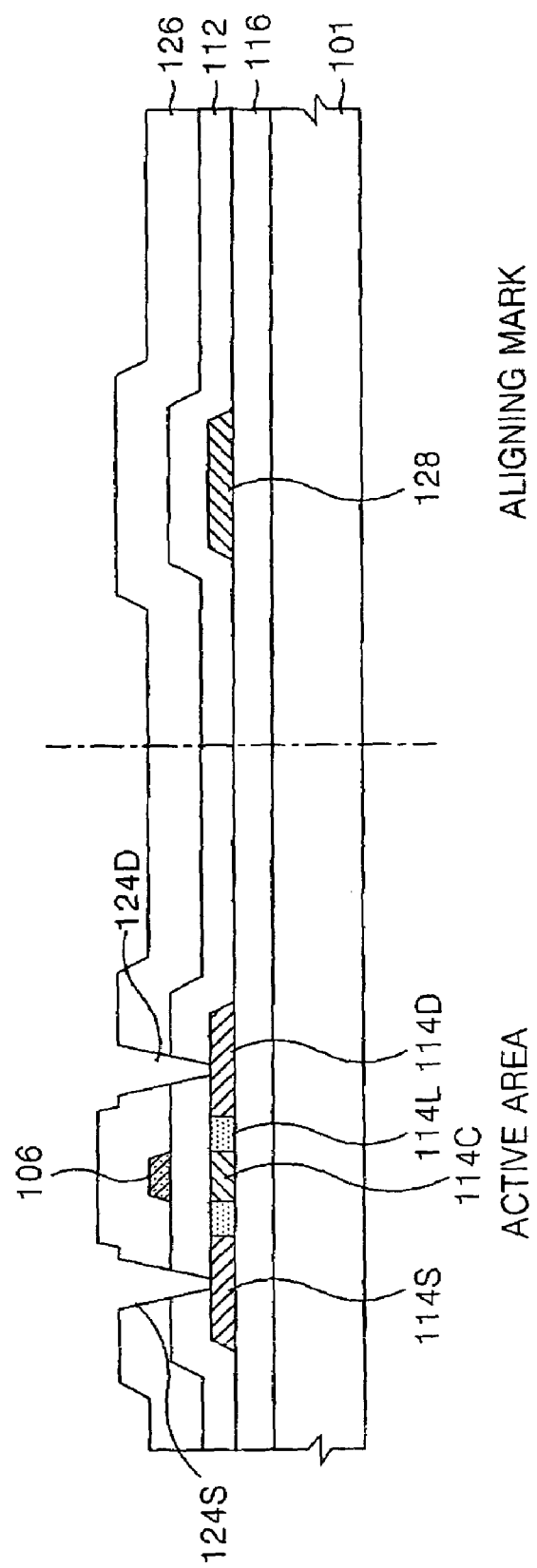

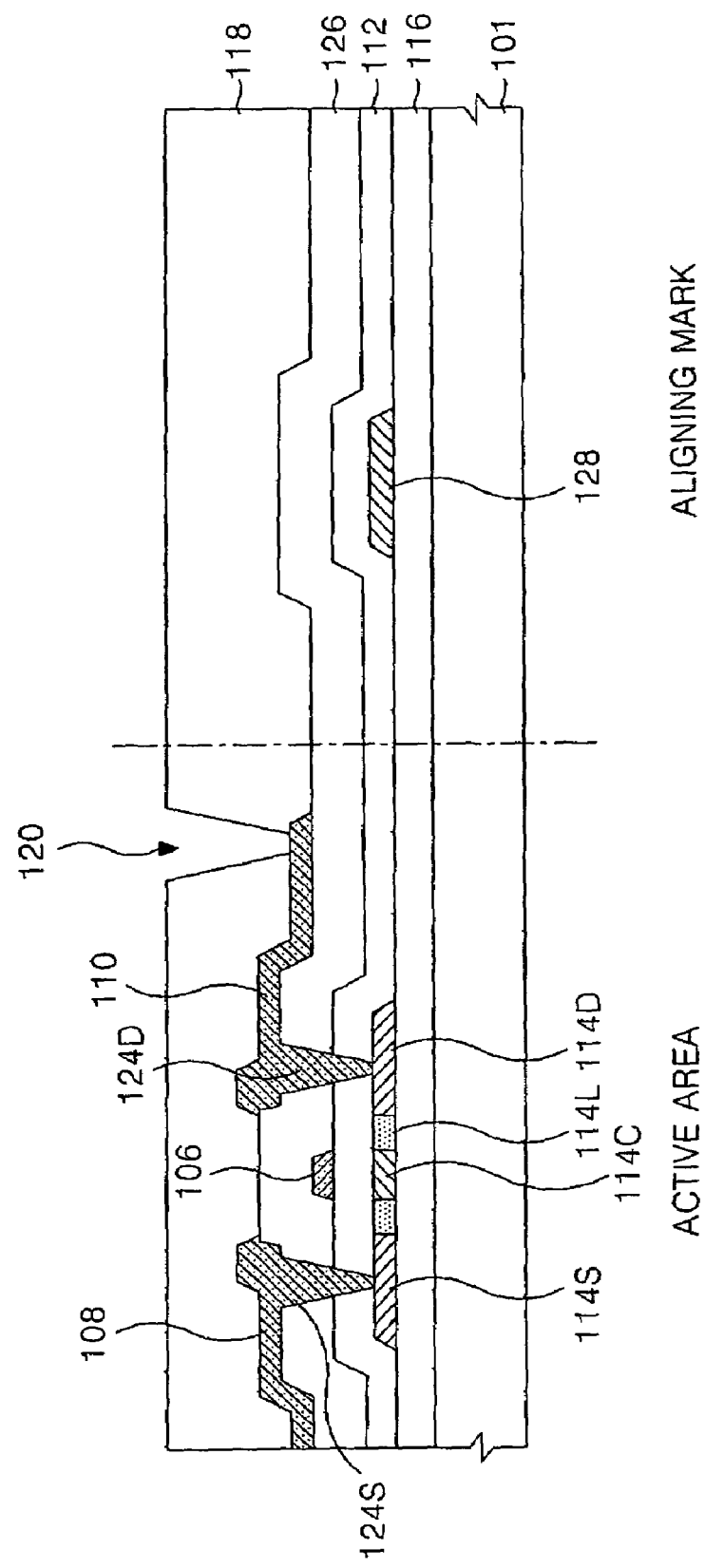

LIQUID CRYSTAL DISPLAY DEVICE AND METHOD OF FABRICATING THE SAME

This application claims the benefit of Korean Patent Application No. 2003-43804, filed on Jun. 30, 2003, which is hereby incorporated by reference for all purposes as if fully set forth herein.

BACKGROUND OF THE INVENTION

1. Field of the Invention

The present invention relates to a liquid crystal display device using poly-silicon, and more particularly to a liquid crystal display device and a fabricating method thereof that reduce the number of processes and production cost.

2. Discussion of the Related Art

Silicon is divided into two main classes of amorphous silicon and crystalline silicon in accordance with crystallization state.

Amorphous silicon can be deposited into a thin film at a low temperature below 350° C. Because of this, amorphous silicon is mainly used for thin film transistors of liquid crystal display devices. However, it is difficult to apply amorphous silicon to a large-size liquid crystal display device that requires an excellent electrical characteristic due to its low mobility below 0.5 cm²/Vs.

When compared with amorphous silicon, poly-silicon (crystalline silicon) has a high mobility of several tens to hundreds of cm²/Vs. Thus, there has been active research on high-density and large-size liquid crystal display (LCD) devices by applying poly-silicon to the semiconductor layer of the thin film transistors (TFT) of the LCD devices. In particular, when the poly-silicon TFTs are applied to a liquid crystal display panel, the TFTs of the screen area and the driving circuits can be fabricated or integrated together on the same substrate.

In general, the electrical properties of poly-silicon depend on the size of its crystal grain. That is, the bigger the size of crystal grain is, the higher the mobility of poly-silicon is.

Such a poly-silicon layer can be formed with various methods. It can be directly deposited on a substrate, or it can be formed by crystallizing amorphous silicon which is deposited on a substrate. Plasma enhanced chemical vapor deposition (PECVD) method is generally used to directly deposit poly-silicon on a substrate in which poly-silicon is deposited using a mixture gas of $SiF_4$, $SiH_4$ and $H_2$ at a deposition temperature above 400° C. Due to the difficulty of controlling the crystal grain, this direct-depositing method is not preferred for an actual liquid crystal display device. The methods of crystallizing amorphous silicon into poly-silicon includes solid phase crystallization (SPC) in which amorphous silicon that is deposited on a substrate is heated in a furnace and is then crystallized, and a method in which amorphous silicon that is deposited on a substrate is irradiated by an excimer laser and is then crystallized. The crystallizing method using an excimer laser is mainly used to form a poly-silicon layer in an LCD device because its process temperature is low and it is relatively easy to control the crystal grain.

Recently, a new crystallizing process called sequential lateral solidification (hereinafter 'SLS') has been introduced in the industry in which an excimer laser is irradiated on an amorphous silicon thin film to completely melt the thin film, and then the crystals of the thin film grow vertically from the side surface. This SLS technique is disclosed in International Patent No. WO 97/45827 and Korea Patent Publication (Laid-Open) No. 2001-004129.

FIGS. 1 and 2 represent a related art poly-silicon TFT in a liquid crystal display device.

Referring to FIGS. 1 and 2, the poly-silicon TFT of the liquid crystal display device (top-gate type) includes a gate electrode 6 connected to a gate line 2, a source electrode 8 connected to the data line 4, a drain electrode connected to a pixel electrode 22, and an active layer 14 to form a channel in response to a control signal applied to the gate electrode 6.

The active layer 14 includes a channel area 14C, a source area 14S, a drain area 14D and a lightly doped drain (herein after 'LDD') area 14L, wherein the channel area 14C is a poly-silicon layer formed on a buffer film 16, overlaps the gate electrode 6, and is not doped with impurities. When the poly-silicon TFT is N-type, the source area 14S and the drain area 14D are doped with n+ ions, and the LDD area 14L is doped with n− ions. The LDD area 14L is located between the channel area 14C and the source area 14S and between the channel area 14C and the drain area 14D to reduce the off-current of the poly-silicon TFT.

The gate electrode 6 overlaps the channel area 14C of the active layer 14 with a gate insulating film 12 therebetween, and forms a channel through which electric currents flow between the source electrode 8 and the drain electrode 10 in response to a scan voltage supplied from the gate line 2. The source electrode 8 is connected to the source area 14S of the active layer 14 through a source contact hole 24S that runs through the gate insulating film 12 and an interlayer insulating film 26. The drain electrode 14D is connected to the drain area 14D of the active layer 14 through a drain contact hole 24D that runs through the gate insulating film 12 and the interlayer insulating film 26.

The poly-silicon TFT supplies a data voltage of the data line 4 to the pixel electrode 22 connected to the drain electrode 10, in response to a scan pulse from the gate line 2.

An aligning mark 28 is formed at four edges of the substrate of the liquid crystal display device. The aligning mark 28 is used to align the masks in the fabricating process. The aligning mark 28 is formed with a semiconductor layer along with the active layer 14 at the same time.

FIGS. 3A to 3F illustrate a fabricating method of the liquid crystal display device.

Referring to FIG. 3A, a buffer film 16 is formed by depositing an insulating material such as $SiO_2$ or $SiN_x$ on the entire surface of a lower substrate 1. An amorphous silicon layer is deposited on the entire surface of the buffer film 16. Hydrogen contained in the amorphous silicon layer is removed through a dehydrogenation process in which the amorphous silicon layer is heated at about 400° C. After the dehydrogenation process, the amorphous silicon layer is crystallized by a laser annealing into a poly-silicon layer.

Referring to FIG. 4A, when the SLS method is used for the laser crystallization process, a mask 41 is aligned on the amorphous silicon layer 43. The mask 41 includes a transmitting pattern 41a and a shielding pattern 41b, wherein the transmitting pattern 41a transmits laser beam 42 and the shielding pattern 41b blocks the laser beam 42. The laser beam 42 is irradiated on the amorphous silicon layer 43 through the mask 41. Then, the amorphous silicon layer 43 exposed to the laser beam 42 through the transmitting pattern 41a of the mask 41 is melted. The amorphous silicon layer 43 on which the laser beams 42 are irradiated is melted down to reach the interface that is in contact with the buffer film 16. The amorphous silicon layer 43 melted in this way becomes crystallized as its temperature becomes lower. Crystallization is induced from seeds that exist at the side surface that is in contact with the adjacent amorphous silicon layer 43, which is in a solid state. Through this crystallization process, the amorphous silicon layer 43 irradiated by the laser beams 42 transforms into a poly-silicon layer 44 as illustrated in FIGS. 4A and 5A. Subsequently, at least one of the mask 41 and the substrate 1 moves to align the transmitting pattern 41a of the mask 41 to the amorphous silicon layer 43 that has not been crystallized. Then, the laser beam 42 is irradiated on the amorphous silicon layer 43 through the moved mask 41. After the rest of the amorphous silicon layer 43 is melted, crystallization again proceeds from the seeds existing at the side surface, i.e., the interface with the poly-silicon layer 44, as its temperature becomes lower. The entire surface or part of the amorphous semiconductor layer 43 is crystallized to become the poly-silicon layer 44 through two repetitions of such an exposure process, as illustrated in FIGS. 4B and 5B.

Referring to FIG. 6A, a photo-resist 47 is spread over the entire surface of the poly-silicon layer 44. A mask 45 is aligned on the photo-resist 47 for patterning. The mask 45 has a transmitting pattern 45a and a shielding pattern 45b, wherein the transmitting pattern 45a is for defining the active area and the aligning mark by transmitting the laser beam 46, and the shielding pattern 45b is for blocking the laser beam 46. After the photo-resist 47 is developed as in FIG. 6B, the poly-silicon layer 44 is dry-etched through the remaining pattern of the photo-resist 47. After the dry-etch process, when the remaining patterns of the photo-resist 47 are removed by a stripping process, the pattern of the active layer 14 and the aligning mark 28 are formed on the substrate 1, as illustrated in FIG. 3A.

FIG. 7 summarizes a process sequence from the buffer layer 16 to the active layer 14 and the aligning mark 28. The process sequence includes the following steps in order: a deposition process of the buffer layer 16 (step S11), a deposition process of the amorphous silicon layer 43 (step S12), a dehydrogenation process (step S13), a laser crystallization process (step S14), a photolithography process for defining the active layer 14 and the aligning mark 28, which includes a photo-resist spreading process, an exposure process and a development process (step S15), an etching process of the poly-silicon layer 44 (step S16), and removing process of the photo-resist (step S17).

Referring to FIG. 3B, an insulating material such as $SiO_2$ or $SiN_x$ is deposited on the entire surface of the buffer layer 16 on which the active layer 14 and the aligning mark 28 have been formed, thereby forming a gate insulating film 12. A gate metal layer such as aluminum and aluminum/neodymium is deposited on the entire surface of the lower substrate 1 where the gate insulating film 12 has been formed. The mask for defining the gate metal patterns is aligned on the gate metal layer. And, the gate metal layer is patterned by performing another photolithography process including a spreading process, an exposure process and a development process of a photo-resist, an etching process and a removing process of the photo-resist. As a result, a gate electrode 6 of the poly-silicon TFT, a gate line 2 and a gate pad (not shown) are formed on the gate insulating film 12.

When the gate electrode 6 is formed in this way, n– ions are injected into the active layer 14 using the gate electrode 6 as a mask. Then, the LDD area 14L is formed at both sides of the active layer 14C of pure poly-silicon that overlaps the gate electrode 6.

Referring to FIG. 3C, a photo-resist (not shown) is spread on the entire surface of the lower substrate 1 where the gate metal patterns have been formed. A mask is aligned on the photo-resist to define a source area 14S and a drain area 14D of the active layer 14. The photo-resist patterns are formed on the lower substrate 1 by an exposure and development process, with the photo-resist patterns exposing the source area 14S and the drain area 14D of the active layer 14. n+ ions are then injected into the source area 14S and the drain area 14D of the active layer 14 with the photo-resist patterns.

Referring to FIG. 3D, an insulating material such as $SiO_2$ or $SiN_x$ is deposited on the entire surface of the gate insulating film 12, thereby forming an interlayer insulating film 26 on the gate insulating film 12. A photo-resist (not shown) is spread on the entire surface of the interlayer insulating film 26. And, a mask is aligned on the photo-resist to define a source contact hole 24S and a drain contact hole 24D. The photo-resist patterns are formed on the interlayer insulating film 26 through an exposure and development process. The interlayer insulating film 26 and the gate insulating film 12 are etched with the photo-resist patterns. As a result, the source contact hole 24S and the drain contact hole 24D that run through the interlayer insulating film 26 and the gate insulating film 12 are formed, with the source area 14S and the drain area 14D of the active layer 14 being exposed.

Referring to FIGS. 3E and 3F, a metal layer is deposited on the entire surface of the interlayer insulating film 26 where the source contact hole 24S and the drain contact hole 24D have been formed. A photo-resist (not shown) is spread on the entire surface of the metal layer. And, a mask is aligned on the photo-resist to define a source electrode 8 and a drain electrode 10. The photo-resist patterns are formed on the metal layer by an exposure and development process. The metal layer is etched with the photo-resist patterns, and the photo-resist patterns are removed. As a result, the source electrode 8 and drain electrode 4 are formed on the lower substrate 1, along with a data line 4 and data pads (not shown) at the same time. The source electrode 8 is connected to the source area 14S of the active layer 14 through the source contact hole 24S. The drain electrode 10 is connected to the drain area 14D of the active layer 14 through the drain contact hole 24D. An inorganic or organic insulating material is formed on the entire surface of the interlayer insulating film 26 where the source electrode 8 and the drain electrode 10 have been formed in this way, thereby forming a protective film 18. A photo-resist (not shown) is spread on the entire surface of the protective film 18. And, a mask is aligned on the photo-resist to define a pixel contact hole 20. The photo-resist patterns are formed on the protective film 18 through an exposure and development process. The protective film 18 is etched with the photo-resist patterns. As a result, the pixel contact hole 20 that runs through the protective film 18 is formed, with part of the drain electrode 10 being exposed.

A transparent conductive material, for example, ITO is deposited on the entire surface of the protective film where the pixel contact hole 20 has been formed. A photo-resist (not shown) is spread on the entire surface of the transparent conductive material layer. And, a mask is aligned on the photo-resist to define the pixel electrode 22 (See FIG. 2). The photo-resist patterns are formed on the transparent conductive material layer by an exposure and development process. The transparent conductive material layer is etched with the photo-resist patterns. As a result, the pixel electrode 22 connected to the drain electrode 10 through the pixel contact hole 20 is formed, as illustrated in FIGS. 1 and 2.

However, the fabricating method of the poly-silicon TFT of the related art, as described above, is disadvantageous in that it requires a large number of processes and a long time, and that materials such as photo-resist are wasted. Also, due to such problems, the production cost is high.

SUMMARY OF THE INVENTION

Accordingly, the present invention is directed to a liquid crystal display device and a fabricating method thereof that substantially obviates one or more of the problems due to limitations and disadvantages of the related art.

An advantage of the present invention is to provide a liquid crystal display device and a fabricating method thereof that reduce the number of processes and production cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device may, for example, include a poly-silicon pattern that is patterned by a concurrent etching process of amorphous silicon and poly-silicon; and a display area where the poly-silicon pattern is formed.

The poly-silicon pattern is an active layer included in each of a plurality of thin film transistors that are formed in the display area.

The liquid crystal display device further includes a second poly-silicon pattern formed on a non-display area of the liquid crystal display device.

The second poly-silicon pattern is an aligning mark.

In another aspect of the present invention, a method of fabricating a liquid crystal display device may, for example, include forming an amorphous silicon on a substrate; forming a poly-silicon pattern by partially crystallizing the amorphous silicon; and etching the amorphous silicon and the poly-silicon pattern at the same time to remove the amorphous silicon and leave the poly-silicon pattern on the substrate.

In the fabricating method, the poly-silicon pattern is an active layer included in each of a plurality of thin film transistors.

In the fabricating method, the poly-silicon pattern is an aligning mark.

In still another aspect of the present invention, a method of fabricating a liquid crystal display device may, for example, include forming a buffer layer on a substrate; forming an amorphous silicon on the buffer layer; forming a poly-silicon pattern by partially irradiating a laser beam on the amorphous silicon and inducing the growth of crystal from the side surface of an area on which the laser beam is irradiated; and etching the amorphous silicon and the poly-silicon at the same time to remove the amorphous silicon and leave the poly-silicon pattern on the substrate.

In the fabricating method, the poly-silicon pattern is an active layer included in each of a plurality of thin film transistors.

In the fabricating method, the poly-silicon pattern is an aligning mark.

The fabricating method further includes the steps of: forming a gate insulating film on the buffer layer to cover the poly-silicon pattern; forming a gate electrode of the thin film transistor that partially overlaps with the poly-silicon pattern by forming a gate metal layer on the gate insulating film and patterning the gate metal layer; forming a doping area on the poly-silicon pattern by injecting impurities at a low concentration into the poly-silicon pattern other than the part thereof that overlaps with the gate electrode by using the gate electrode as a mask; forming a source area and a drain area on the poly-silicon pattern by injecting impurities at a high concentration into part of the doping area; forming a interlayer insulating film on the gate insulating film to cover the gate electrode and forming a first contact hole that runs through the interlayer insulating film and the gate insulating film to expose the source area and the drain area; forming a source electrode of the thin film transistor connected to the source area and a drain electrode of the thin film transistor connected to the drain area; forming a protective film on the interlayer insulating film to cover the source electrode and the drain electrode; and forming a second contact hole on the protective film to expose the drain electrode and forming a pixel electrode connected to the drain electrode.

In yet another aspect of the present invention, a method of fabricating a liquid crystal display device having a plurality of thin film transistors may, for example, include forming an amorphous silicon layer on a substrate; partially crystallizing the amorphous silicon layer using a laser annealing method, wherein the partially crystallized silicon layer has a poly-silicon region and an amorphous silicon region; and etching the partially crystallized silicon layer to remove the amorphous silicon region and leave the poly-silicon region on the substrate without using a photo-resist pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A to 3F are sectional views illustrating a fabricating process of the liquid crystal display device shown in FIG. 1;

FIGS. 12A to 12K are sectional views illustrating the fabricating method of the liquid crystal display device according to the embodiment of the present invention.

DETAILED DESCRIPTION OF THE ILLUSTRATED EMBODIMENTS

Reference will now be made in detail to an embodiment of the present invention, example of which is illustrated in the accompanying drawings. With reference to FIGS. 8 to 12K, an embodiment of the present invention will be explained.

Figure 1:
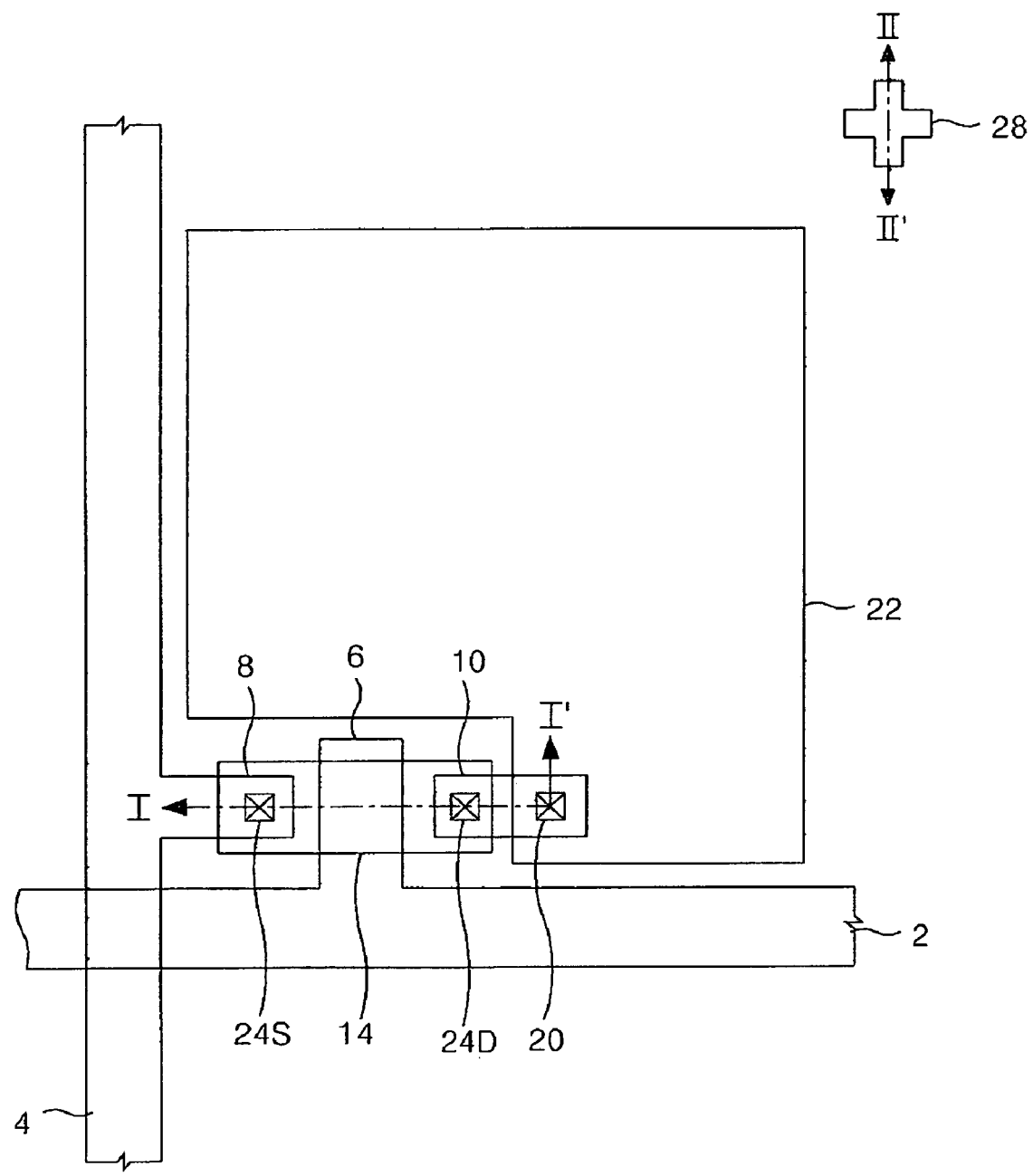
FIG. 1 is a plan view illustrating an aligning mark and a cell of a related art liquid crystal display device.
Figure 2:
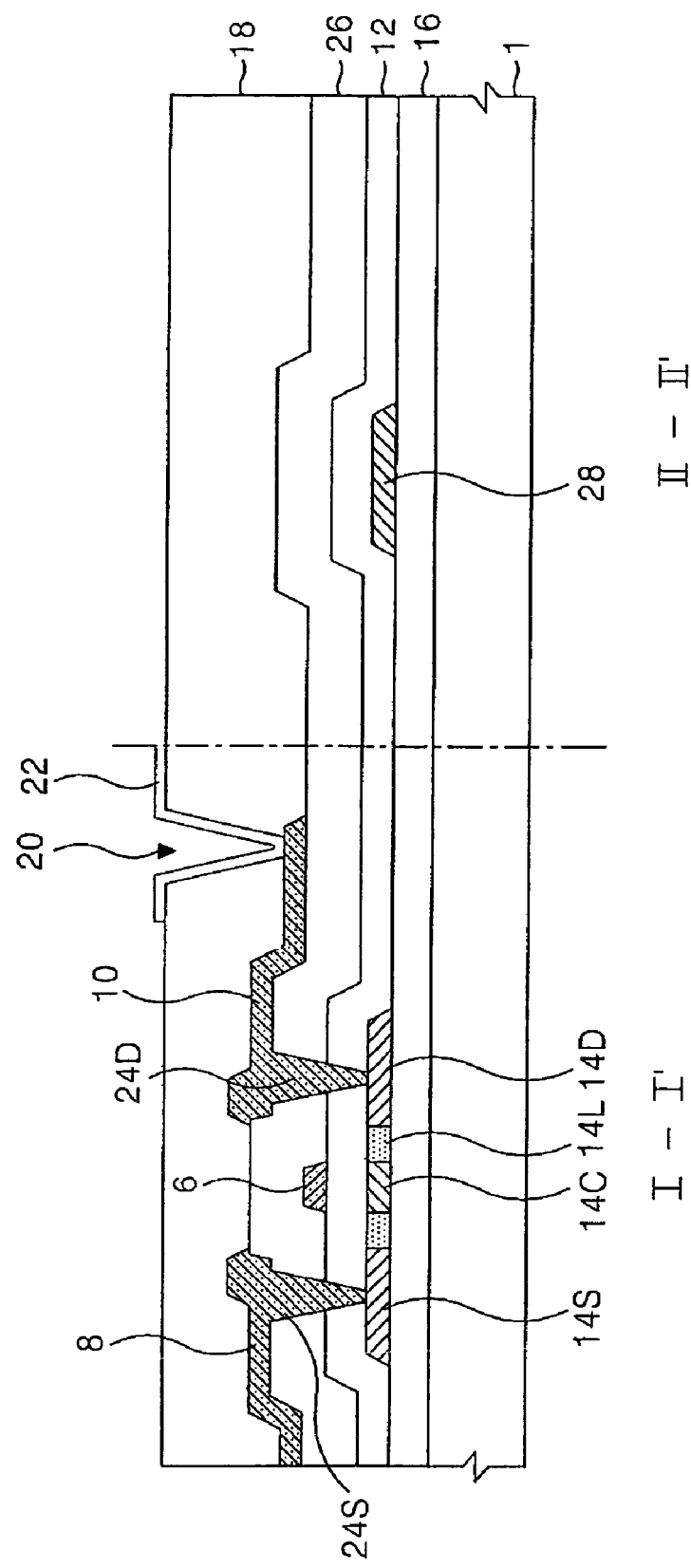
FIG. 2 is a sectional view illustrating the sectional structure of the liquid crystal display device, taken along the lines 'I-I' and 'II-II' of FIG. 1.
Figure 3A:
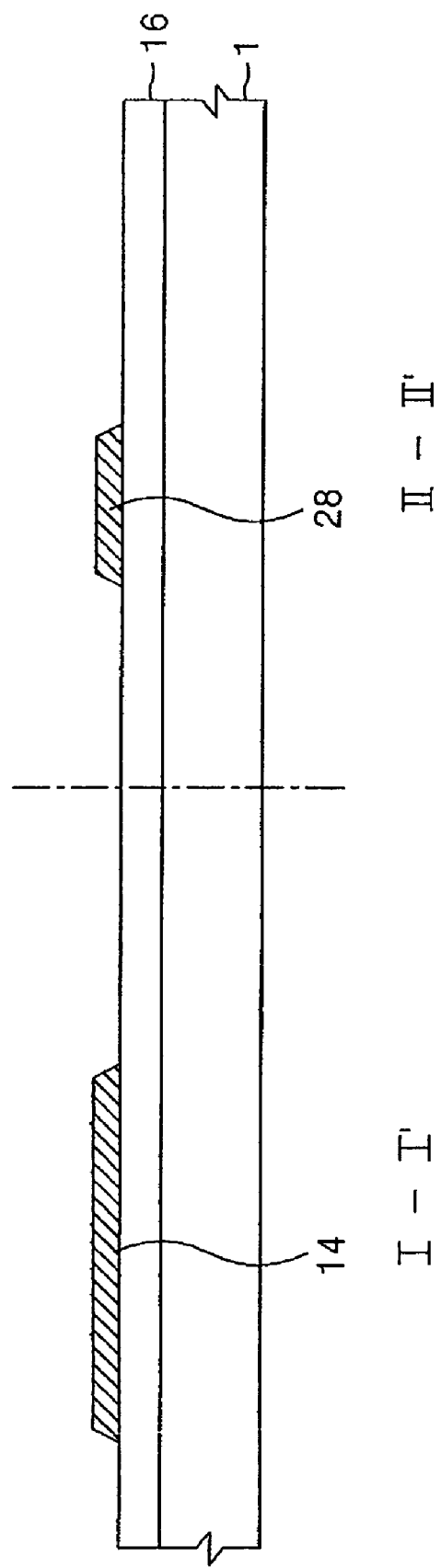
Figure 3C:
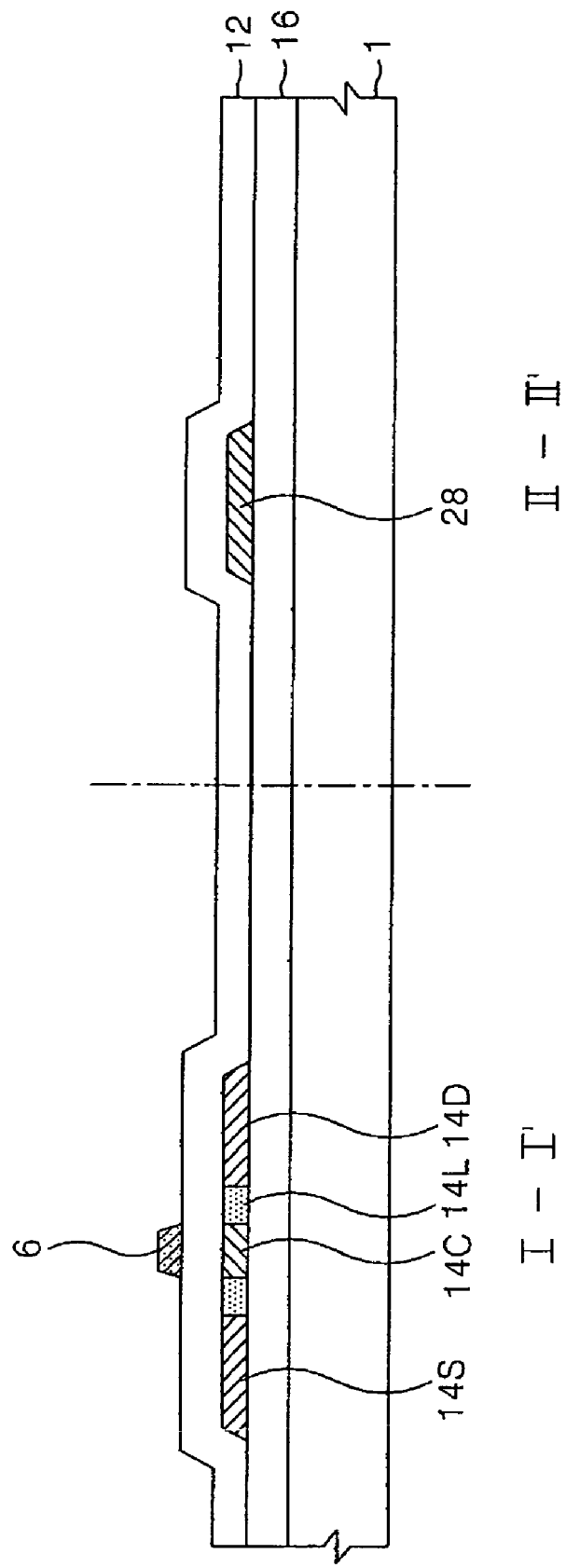
Figure 3D:
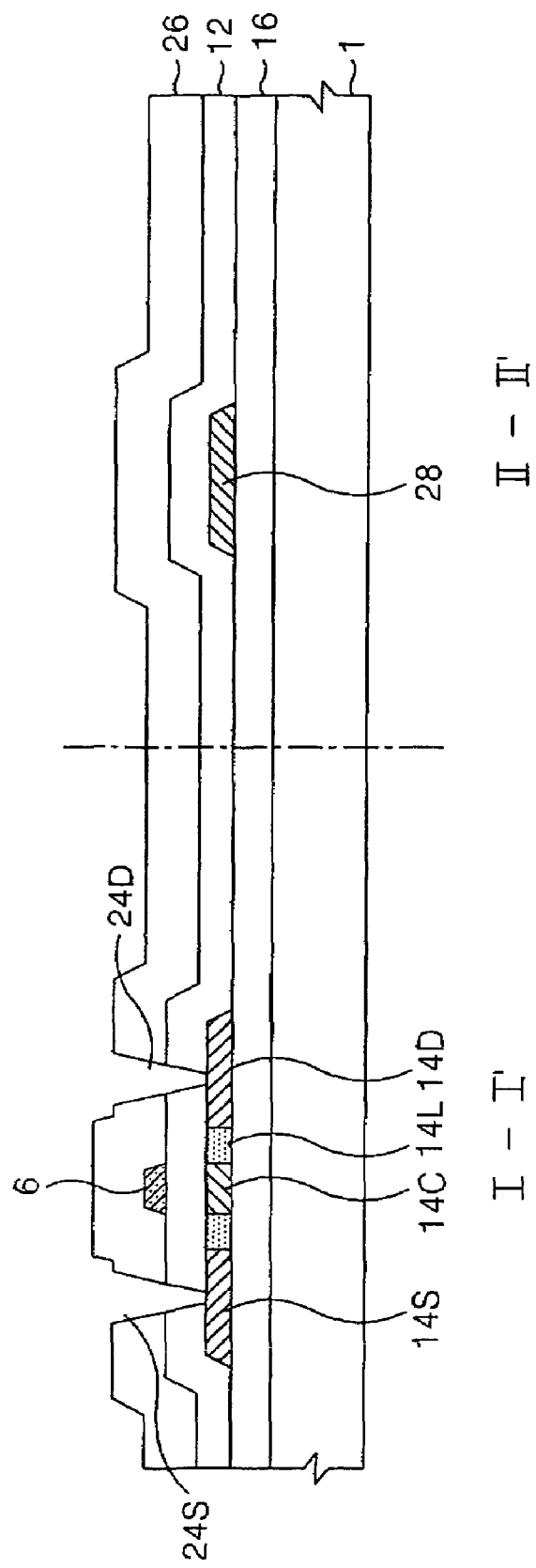
Figure 3F:
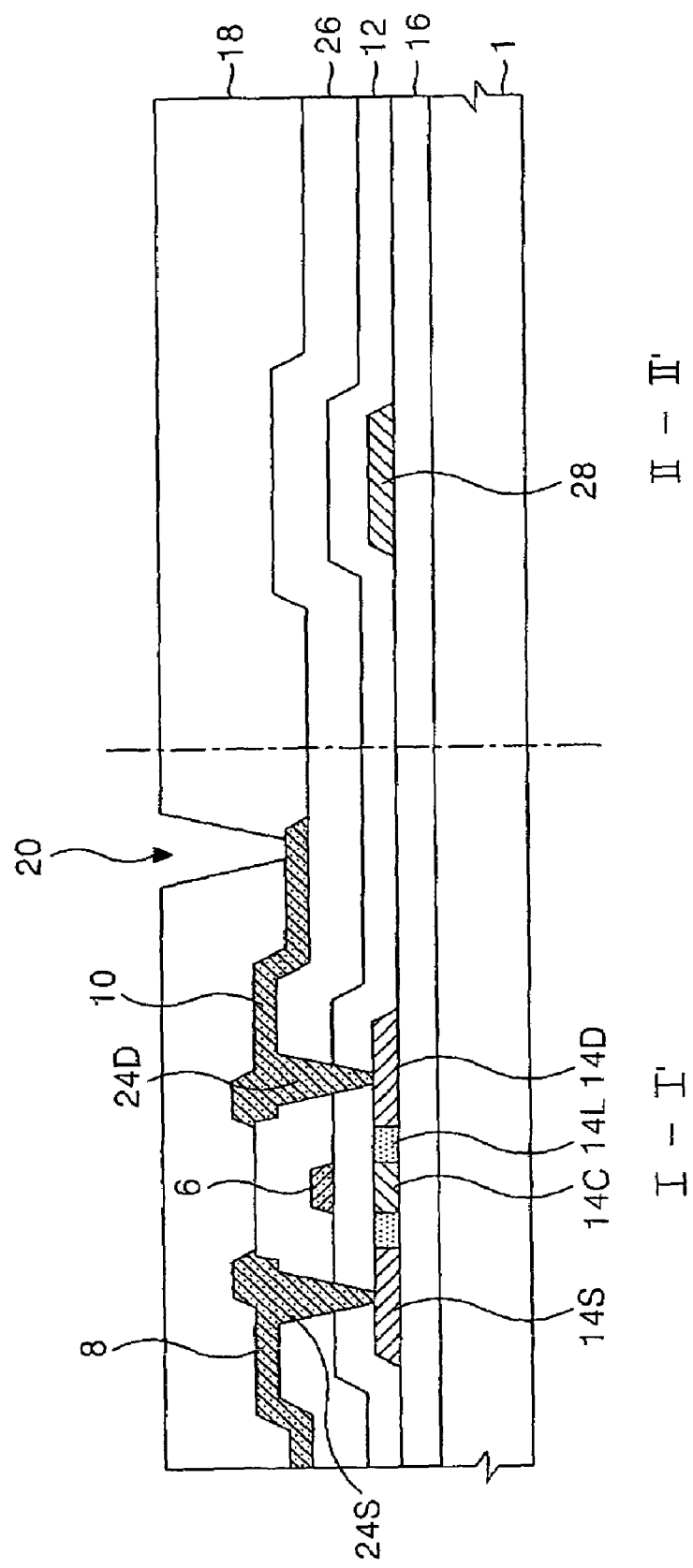
Figure 4A:
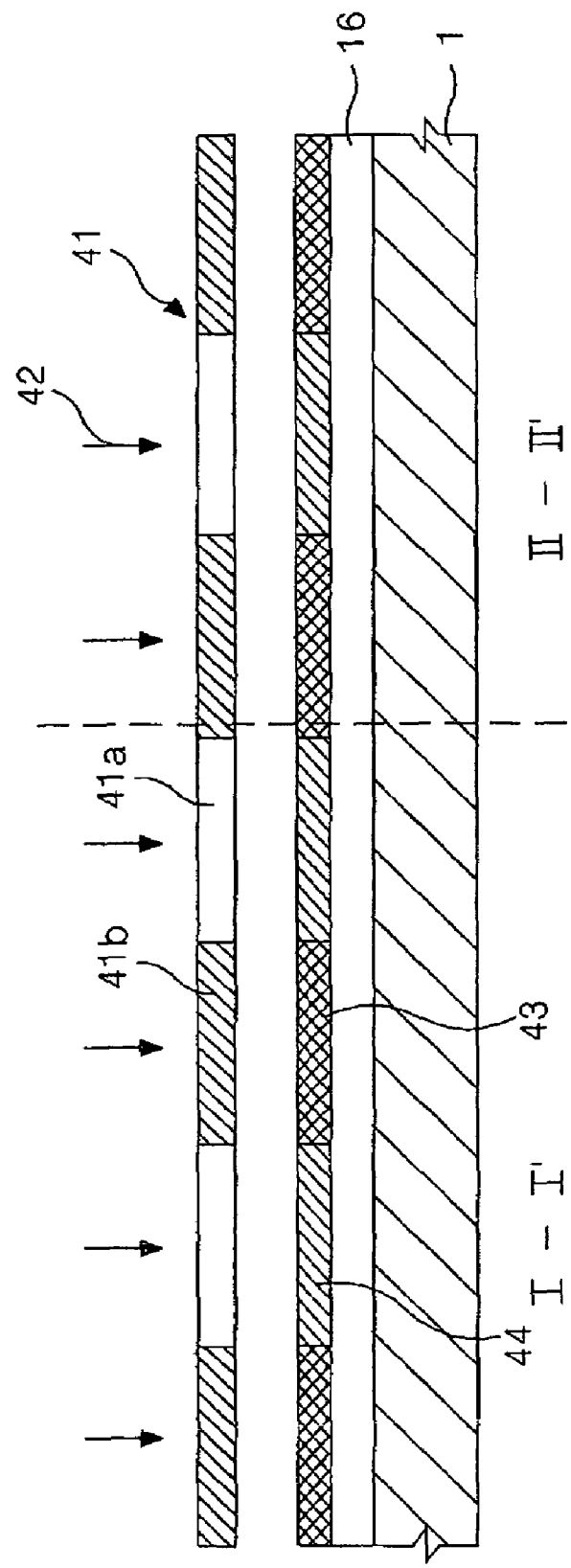
FIGS. 4A and 4B are sectional views illustrating a method of forming a poly-silicon pattern shown in FIG. 3A by a sequential lateral solidification (SLS) method.
Figure 4B:
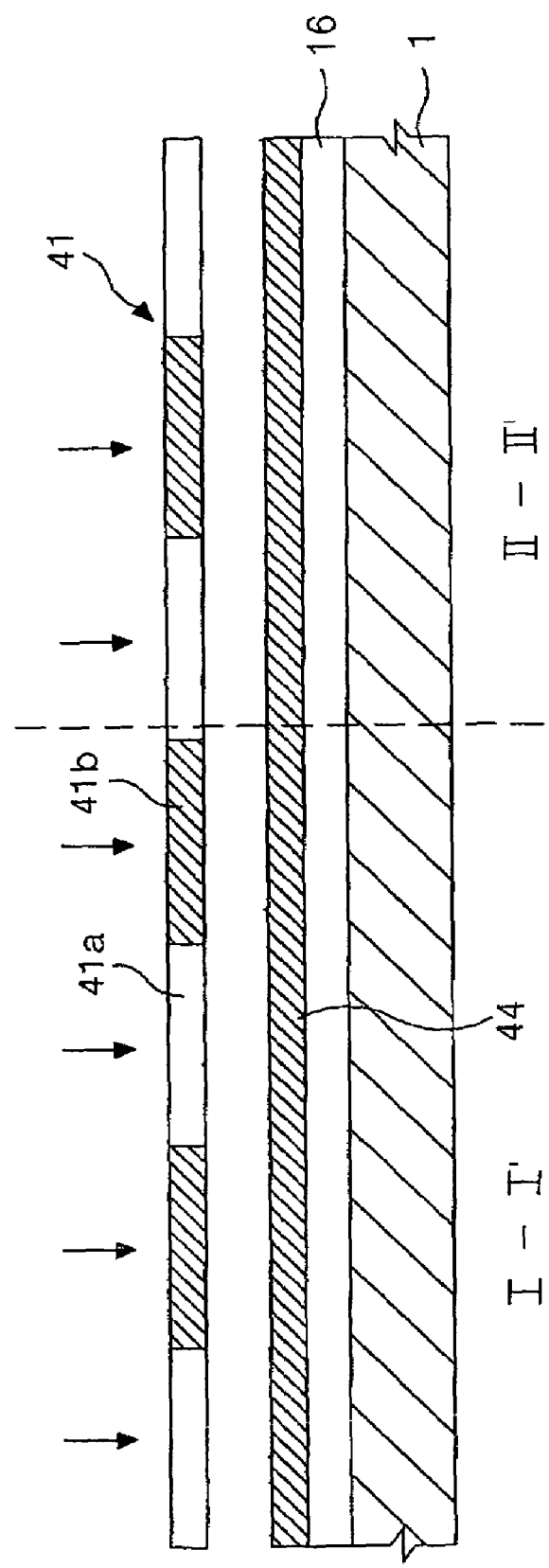
Figure 5A:
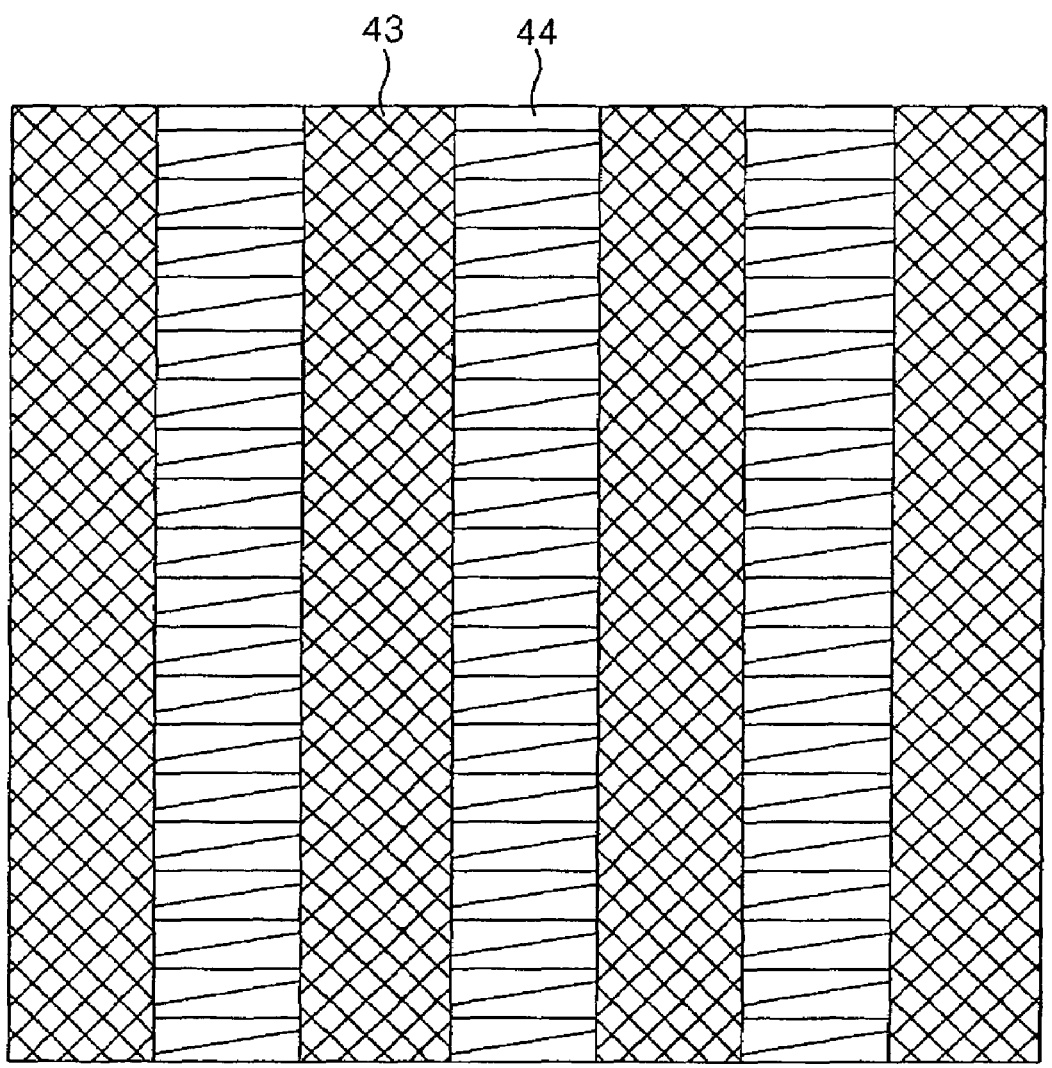
FIGS. 5A and 5B are plan views illustrating the arrangement of the amorphous silicon and the poly-silicon shown in FIGS. 4A and 4B, respectively.
Figure 5B:
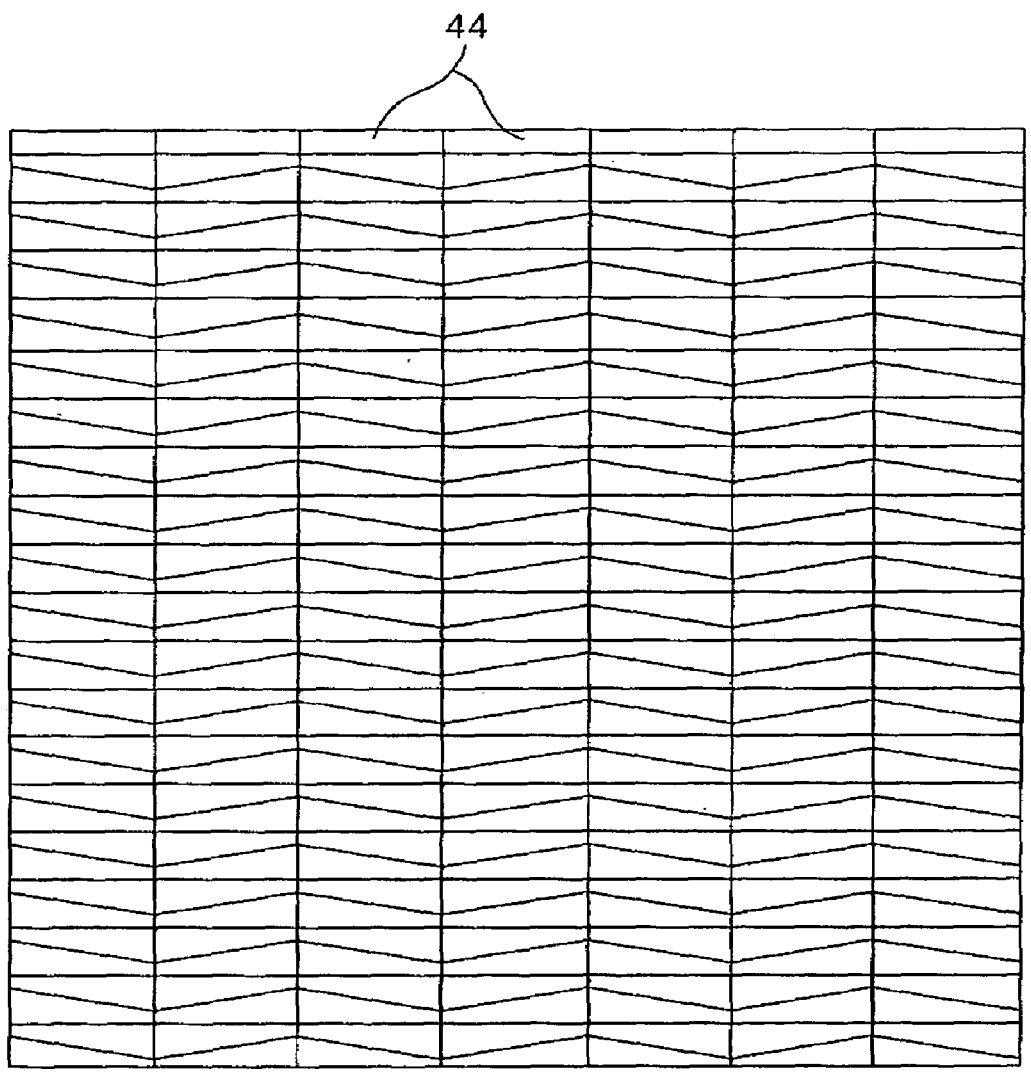
Figure 6A:
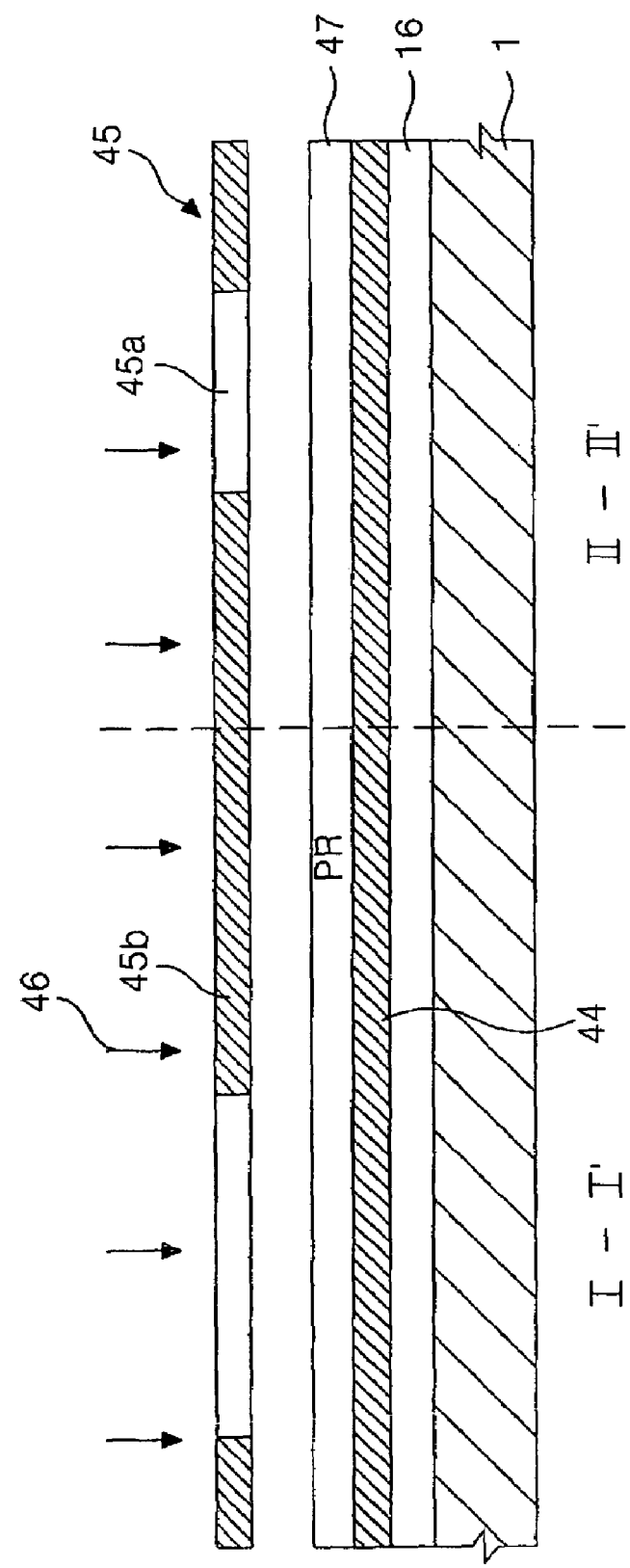
FIGS. 6A and 6B are sectional views illustrating a photolithography process that defines an active layer pattern and an aligning mark with the poly-silicon layer in a fabricating method of the liquid crystal display device of the related art.
Figure 6B:
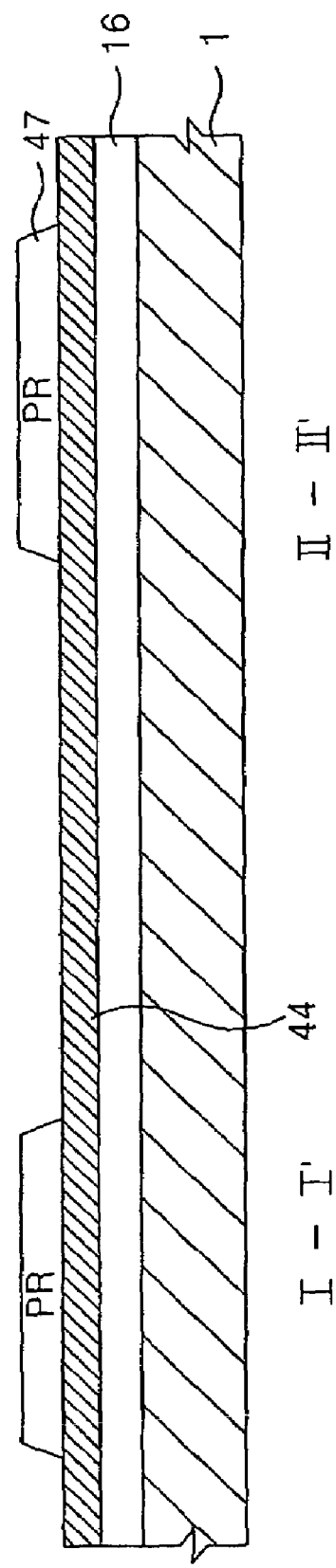
Figure 7:
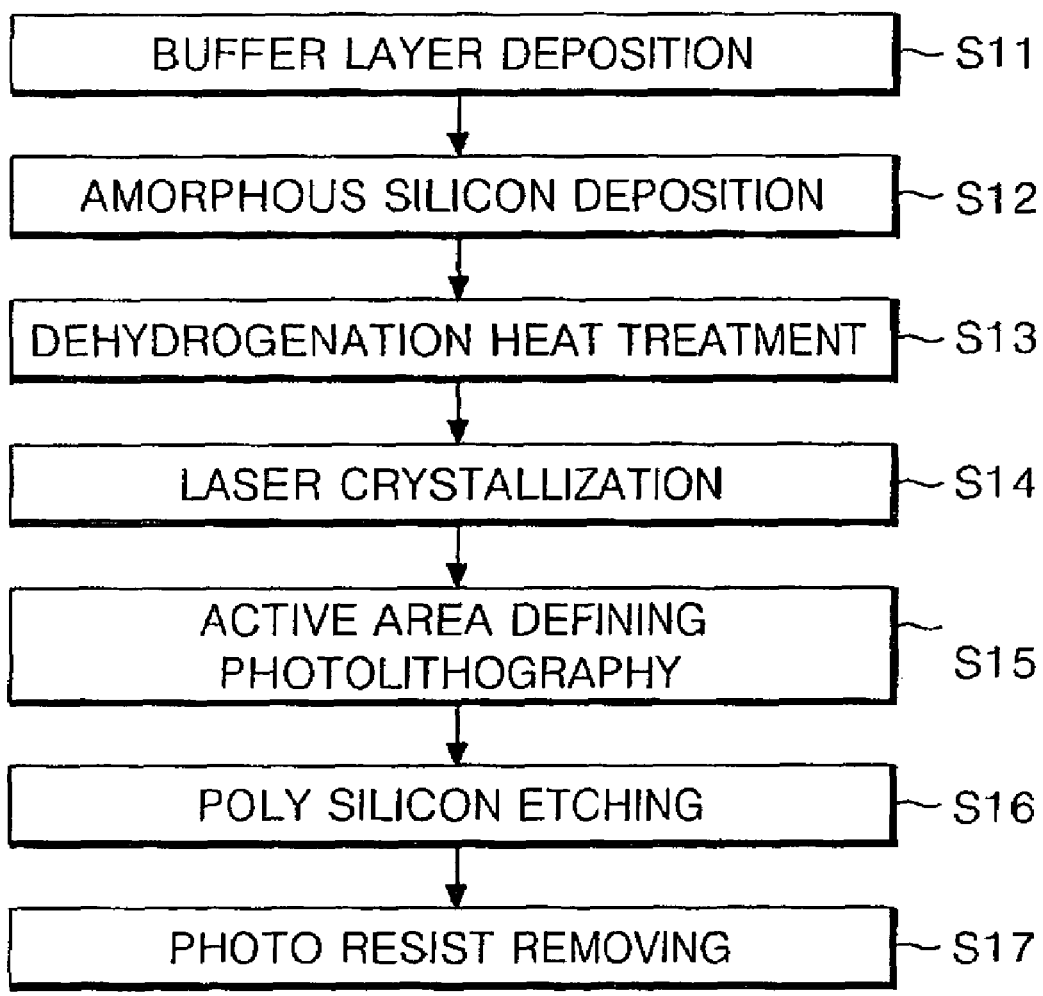
FIG. 7 is a flow chart illustrating a fabricating method of the related art liquid crystal display device.
Figure 8:
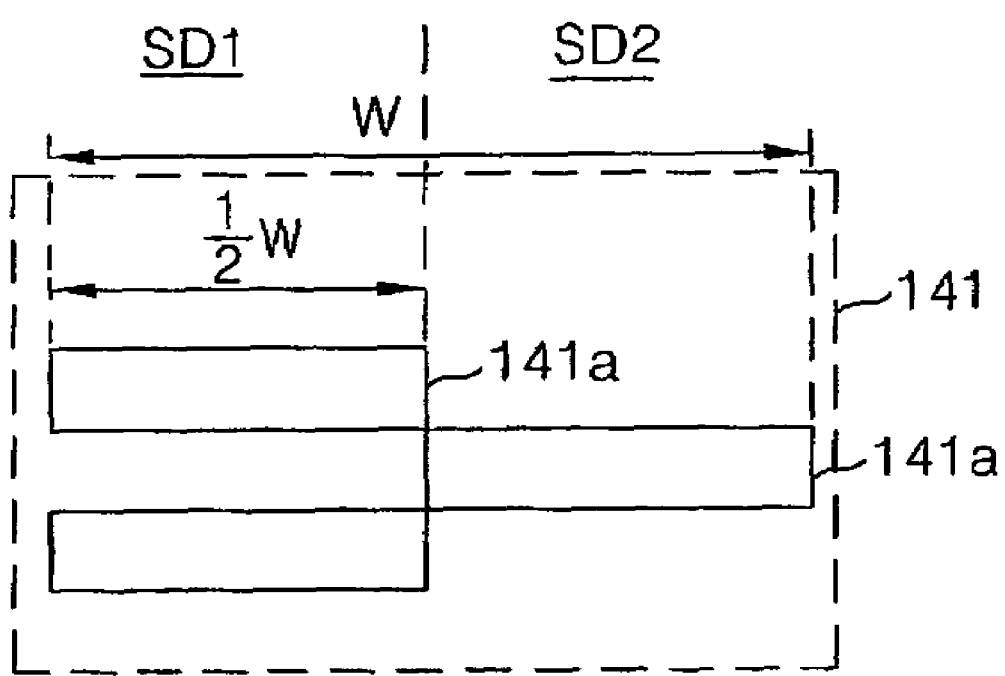
FIG. 8 is a schematic view illustrating a transmitting pattern (or slit) formed in a mask according to an embodiment of the present invention.

Referring to FIG. 8, a mask 141 according to an embodiment of the present invention has transmitting patterns 141*a* for transmitting a laser beam and shielding patterns 141*b* for blocking the laser beam. The transmitting patterns 141*a* are divided into a first shot domain SD1 and a second shot domain SD2 for defining areas corresponding to an active layer and an aligning mark of a LCD device. The width of each of the transmitting patterns 141*a* is equal to or less than twice the length of grains grown by seeds that usually form near solid state silicon.

A SLS crystallization process with the mask 141 will be explained in detail. When a laser beam is irradiated on an amorphous silicon layer through the first shot domain SD1 and the second shot domain SD2, the amorphous silicon corresponding to the transmitting patterns 141*a* of the mask is melted. At this moment, the amorphous silicon exposed to the laser beam is almost completely melted, and crystallization starts from seeds near the side surface, which is the interface between the melted silicon and the solid silicon, as the temperature of the melted amorphous silicon becomes lower. Assuming that the width of the laser beam is 'W' for illustrating purposes, when any one of the mask or a substrate (not shown) moves by ½W in a horizontal direction, the laser beam is irradiated again through the mask on the portion of the amorphous silicon that corresponds to the transmitting patterns of the moved mask (the amorphous silicon that has not been irradiated by the first laser beam), and then the portion of the amorphous silicon transforms into poly-silicon, as the temperature of the irradiated amorphous silicon becomes lower.

Figure 10:
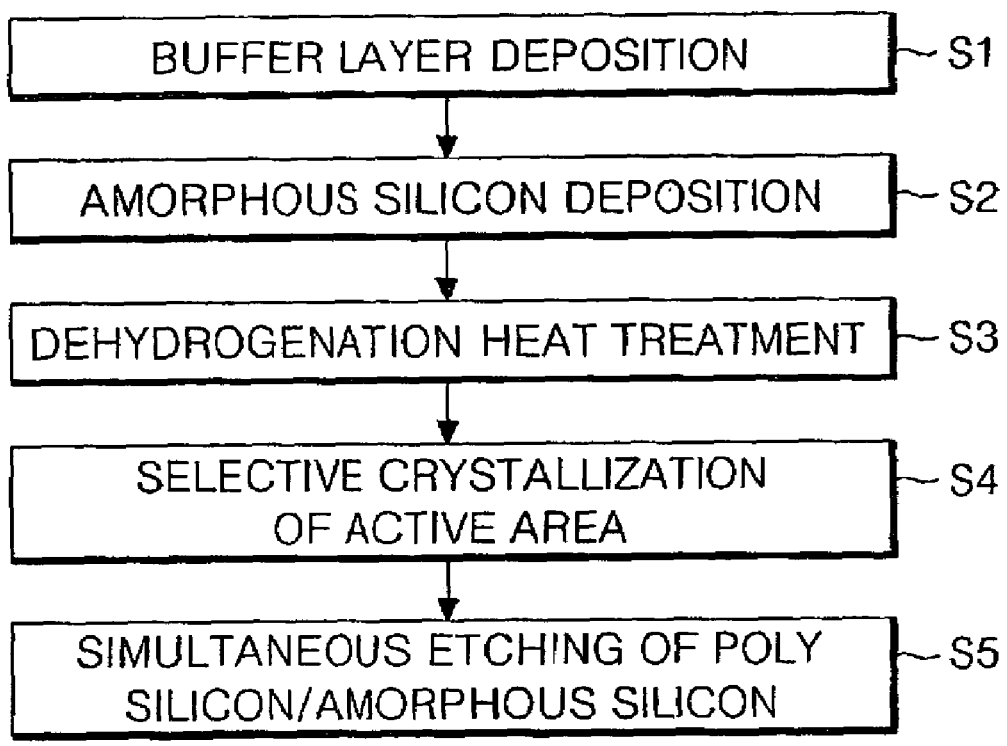
FIG. 10 is a flow chart illustrating a fabricating method of a liquid crystal display device according to an embodiment of the present invention.

FIG. 10 is a flow chart illustrating a fabricating method of a liquid crystal display device according to an embodiment of the present invention.

Referring to FIG. 10, a fabricating method of a liquid crystal display device according to an embodiment of the present invention includes depositing a buffer layer on a substrate and depositing an amorphous silicon layer on the buffer layer. (steps S1 and S2). Subsequently, a dehydrogenation process is performed to remove hydrogen contained in the amorphous silicon layer (step S3), and then a laser beam is irradiated twice through the mask of FIG. 9 on the areas of the amorphous silicon layer corresponding to a pattern of an active layer and a pattern of an aligning mark to induce the crystallization of the amorphous silicon layer, thereby transforming the areas of the amorphous silicon layer corresponding to the pattern of the active layer and the pattern of the aligning mark into a poly-silicon layer. (step S4) Then, the fabricating method further includes etching the substrate that has both the poly-silicon layer and the amorphous silicon layer at the same time. (step S5) In the etching process of step S5, the poly-silicon has a low etching rate because of its dense structure, but the amorphous silicon has a high etching rate because of its loose structure. Due to this, the amorphous silicon is etched deeper and faster than the poly-silicon under the same etching condition. As a result, as the etching process progresses, only the active layer 114 and aligning mark 128 of poly-silicon remain on the substrate as in FIG. 11.

As explained in an earlier section, the related art LCD device requires a photolithography process (step S15) including a photo-resist spreading process, an exposure and development process, and a photo-resist removing process (step S17) in order to define the aligning mark and the active layer of the active area. Compared with this, the fabricating method of the liquid crystal display device according to the embodiment of the present invention can form the active layer 114 and the aligning mark 128 only with the selective laser crystallization process (step S4) and etching process (step S5) by taking advantage of the etching rate difference between the poly-silicon layer 144 and the amorphous silicon layer 143 under the same etching condition.

The fabricating method of the liquid crystal display device in accordance with the principles of the present invention will be described in more detail in conjunction with FIGS. 12A to 12K.

Referring to FIG. 12A, a fabricating method of a liquid crystal display device according to an embodiment of the present invention forms a buffer film 116 by depositing an insulating material such as $SiO_2$ or $SiN_x$ on the entire surface of a lower substrate 101. Then, an amorphous silicon layer 143 is deposited on the entire surface of the buffer film 116. Subsequently, a dehydrogenation process is performed to remove hydrogen contained in the amorphous silicon in which the amorphous silicon layer is heated at about 400° C. After the dehydrogenation process, a laser annealing using a SLS method is performed to transform the amorphous silicon layer into a poly-silicon layer.

Figure 9A:
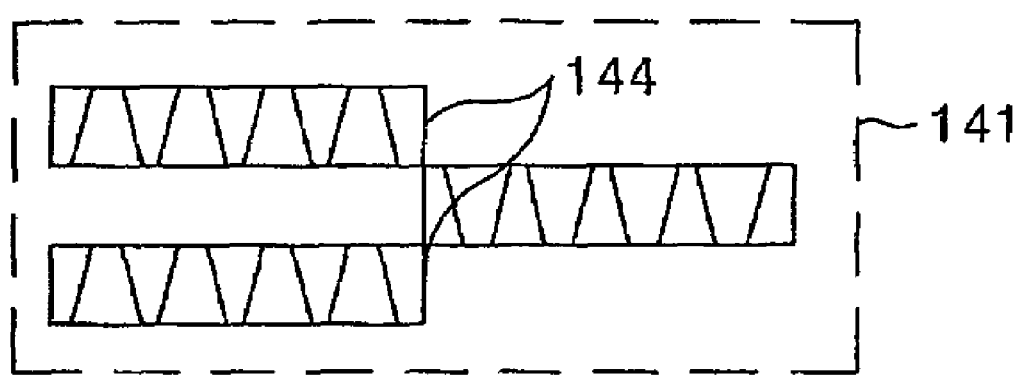
FIGS. 9A and 9B are plan views illustrating a poly-silicon portion formed by a sequential lateral solidification (SLS) method.

As explained in an earlier section with regards to the SLS crystallization process, the following processes are performed to complete the laser annealing using a SLS method according to an embodiment of the present invention. Referring to FIG. 12B, a mask 141 is aligned on the amorphous silicon layer 143 for crystallization. The mask 141 has a transmitting pattern 141*a* and a shielding pattern 141*b*, wherein the transmitting pattern transmits a laser beam 142 and the shielding pattern 141B blocks the laser beam 142. The laser beam 142 is irradiated successively two times on the amorphous silicon layer 143 through the mask 141. Referring to FIGS. 12B and 12C, when irradiating a first laser beam, the laser beam 142 is irradiated on the amorphous silicon layer 143 through a first shot domain SD1 and a second shot domain SD2, thereby melting the amorphous silicon layer 143 of the areas corresponding to the transmitting pattern 141*a*. At this moment, the amorphous silicon layer 143 on which the laser beam 142 is irradiated is melted down to reach the interface that is in contact with the buffer film 116. The amorphous silicon layer 143 melted in this way becomes crystallized as its temperature becomes lower. At this moment, crystallization is induced from seeds that exist at the side surface that is in contact with the adjacent amorphous silicon layer 143, which is in a solid state, and the grains grows vertically from the seeds near the side surface, as shown in FIG. 9A. In this way, the amorphous silicon layer 143 irradiated with the first laser beam transforms into a poly-silicon layer 144, which subsequently becomes part of an aligning mark and an active layer.

Figure 9B:
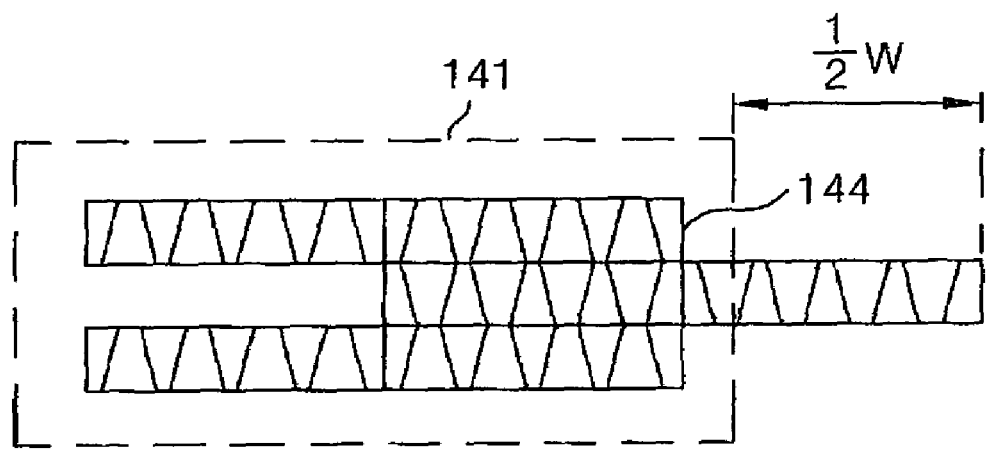

Subsequently, assuming that the width of the laser beam 142 is 'W' for illustrating purposes, when any one of the mask 141 or a lower substrate 101 moves by ½W in a horizontal direction, the laser beam (second laser beam) is irradiated on the amorphous silicon 143 through the first shot domain SD1 and second shot domain SD2 of the mask 141. For this operation, the lower substrate 101 may be installed on an X-Y stage (not shown) so that its transfer can be made in both axial directions of X axis and Y axis, and the mask 142 is installed at an X-Y robot (not shown) for moving the mask 142. With this two times of the laser irradiation, only the amorphous silicon corresponding to the areas of the active layer and the aligning mark are transformed into poly-silicon, as illustrated in FIG. 9B.

Figure 12D:
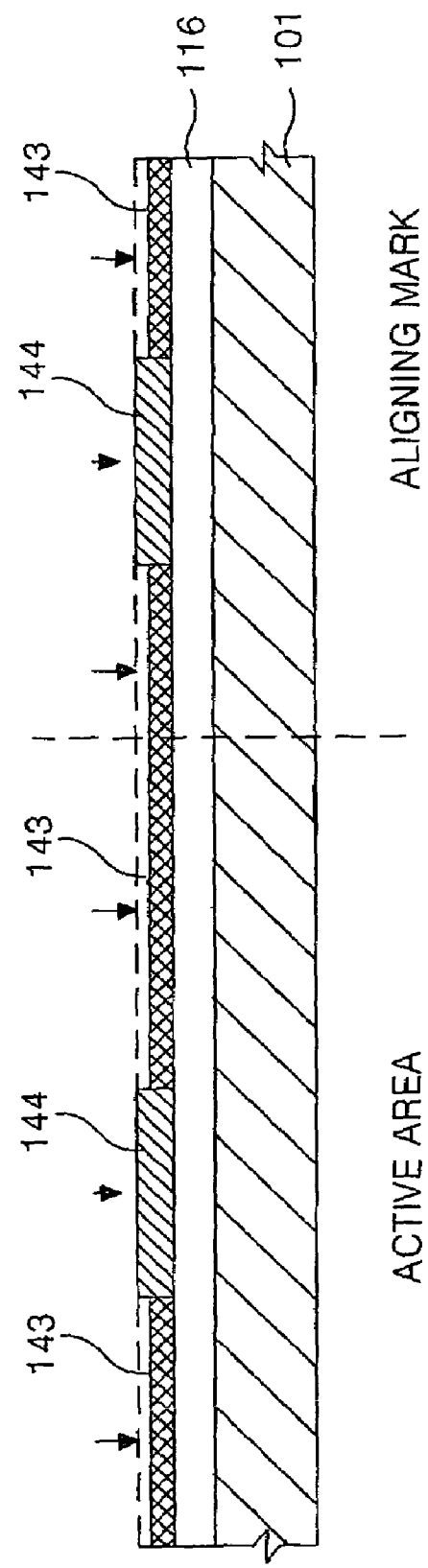

Referring to FIG. 12D, after the laser annealing process, an etching process (dry or wet etching) is performed on the substrate having the poly-silicon layer 144 and the amorphous silicon layer 143 distributed in the same layer to define the active layer and the aligning mark without a photo-resist pattern. The amorphous silicon layer 143 is etched much faster than the poly-silicon layer 144 in the etching process. This is because the poly-silicon has a low etching rate due to its dense structure, and the amorphous silicon has a high etching rate due to its loose structure. Accordingly, the amorphous silicon layer 143 is etched deeper and faster under the same etching condition than the poly-silicon layer 144. As a result, as the etching process progresses, only the active layer 114 and the aligning mark 128 of the poly-silicon layer 144 are left on the substrate.

Figure 11:
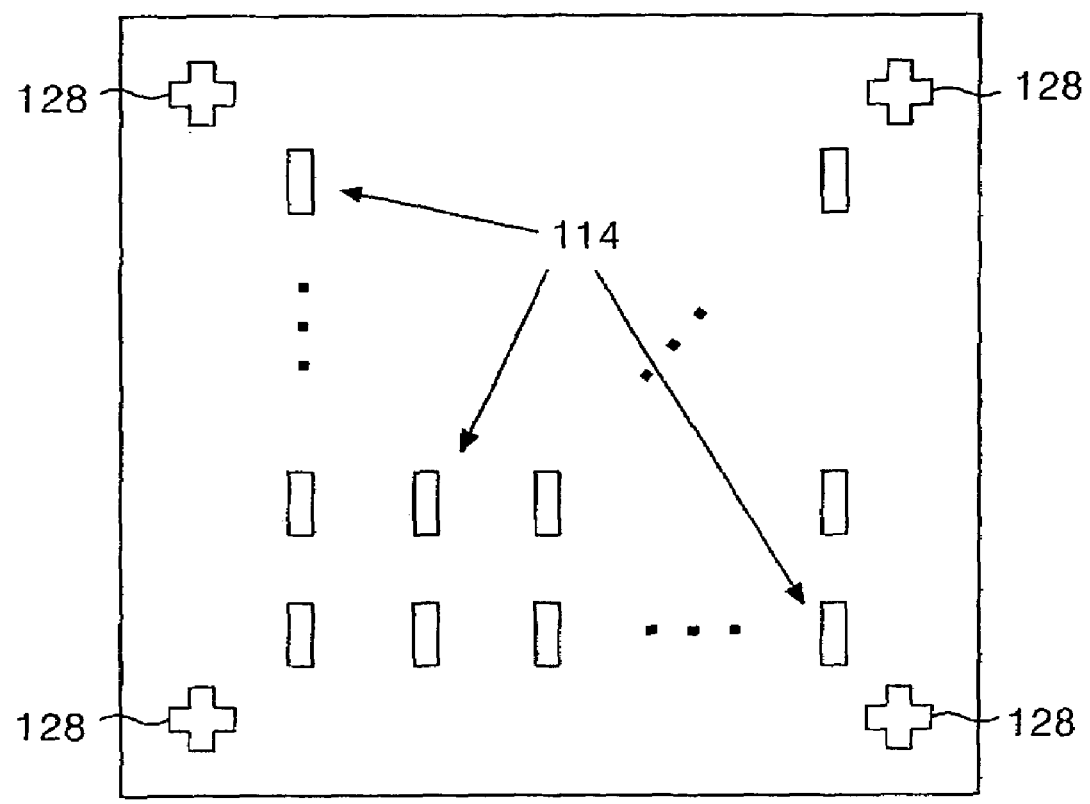
FIG. 11 is a plan view illustrating an aligning mark pattern and an active layer pattern formed in the liquid crystal display device according to the embodiment of the present invention.

Although the pattern of the active layer 114 of poly-silicon has a rectangular shape in FIG. 11, it should be understood that the pattern of the active layer is not limited to such a pattern shape, and that it can be formed to have various shapes such as 'L', 'C' or 'S'. In the same manner, although the pattern of the aligning mark 128 of poly-silicon has a '+' shape in FIG. 11, it should be understood that the pattern of the aligning mark is not limited to such a pattern shape, and that it can be formed to have various shapes such as a circle or quadrangle. The shapes of these patterns can be modified by changing the shape of the transmitting pattern 141 in the mask 141.

Figure 12F:
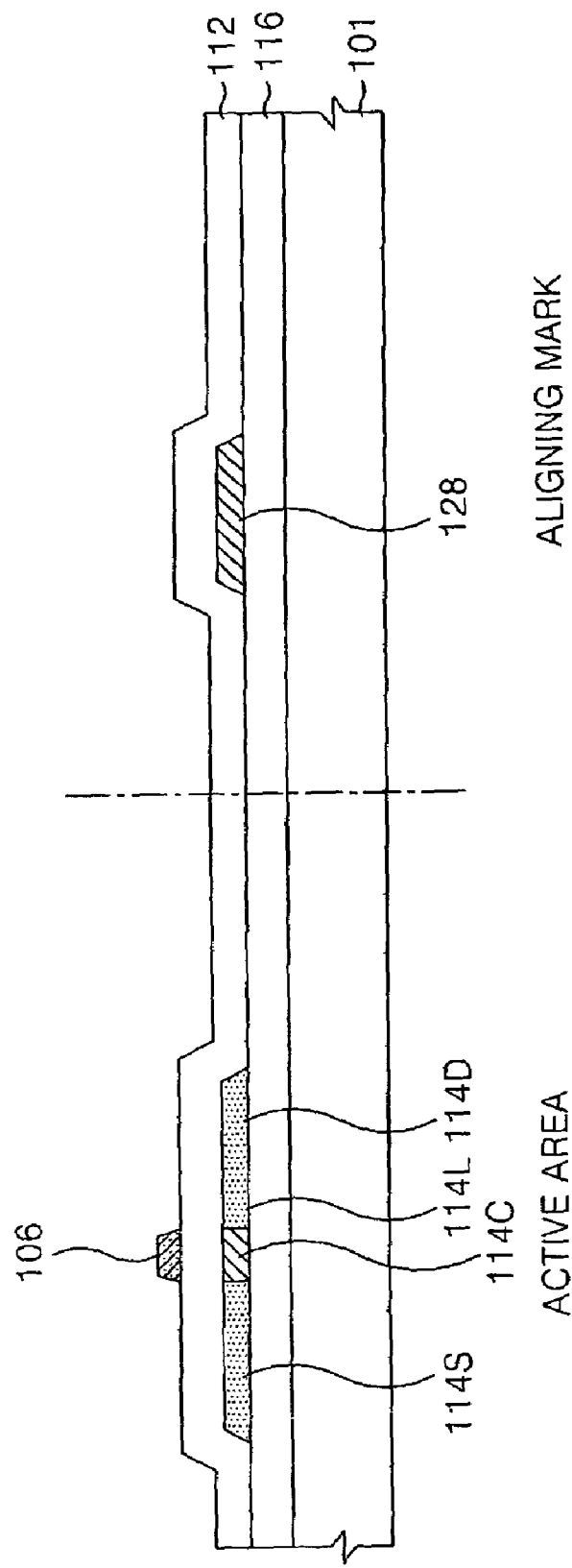

Referring to FIG. 12F, the fabricating method of the liquid crystal display device according to the embodiment of the present invention forms a gate insulating film 112 on the buffer layer 116 by depositing an insulating material such as $SiO_2$ or $SiN_x$ on the entire surface of the buffer layer 116, wherein the insulating material covers the active layer 114 and the aligning mark 128. A gate metal layer such as aluminum and aluminum/neodymium is deposited on the entire surface of the lower substrate 101 where the gate insulating film 112 has been formed. A photolithography process with a mask is performed to form gate metal patterns, which includes a spreading process a photo-resist, an exposure and development process, an etching process and a removing process of the photo-resist. As a result, a gate electrode 106 of a poly-silicon TFT, a gate line and a gate pad (not shown) are formed on the gate insulating film 112.

When the gate electrode 106 is formed in this way, n− ions are injected into the active layer 114 using the gate electrode 106 as a mask. Herein, n− ions are impurities such as phosphorus (P) or arsenic (As), and their concentration is in a range of $10^{12}$~$10^{13}$/cm², which is relatively low. Then, an LDD area 114L is formed at both sides of the active layer 114C of pure poly-silicon that overlaps the gate electrode 106.

Referring to FIG. 12G, a photo-resist is spread on the entire surface of the lower substrate 101 where the gate metal patterns have been formed. A mask is aligned on the photo-resist to define a source area 114S and a drain area 114D of the active layer 114. The photo-resist patterns are formed on the lower substrate 101 by an exposure and development process, with the photo-resist patterns exposing the source area 114S and the drain area 114D. n+ ions are then injected into the source area 114S and the drain area 114D of the active layer 114 with the photo-resist patterns. Herein, n+ ions are impurities such as phosphorus (P) or arsenic (As), and their concentration is $1$~$2\times10^{15}$/cm², which is relatively high.

Referring to FIG. 12H, an interlayer insulating film 126 is formed on the gate insulating film 112 by depositing an insulating material such as $SiO_2$ or $SiN_x$ on the entire surface of the gate insulating film 112, wherein the insulating material covers the gate metal patterns including the gate electrode 106. A photo-resist (not shown) is spread on the entire surface of the interlayer insulating film 126. And, a mask is aligned on the photo-resist to define to define a source contact hole 124S and a drain contact hole 124D, and forms photo-resist patterns on the interlayer insulating film 126 through an exposure and development process, with the photo-resist pattern exposing the area of the source contact hole 124S and the area of the drain contact hole 124D. Then, the interlayer insulating film 126 and the gate insulating film 112 are etched to expose the source area 114S and the drain area 114D of the active layer 114.

Figure 12I:
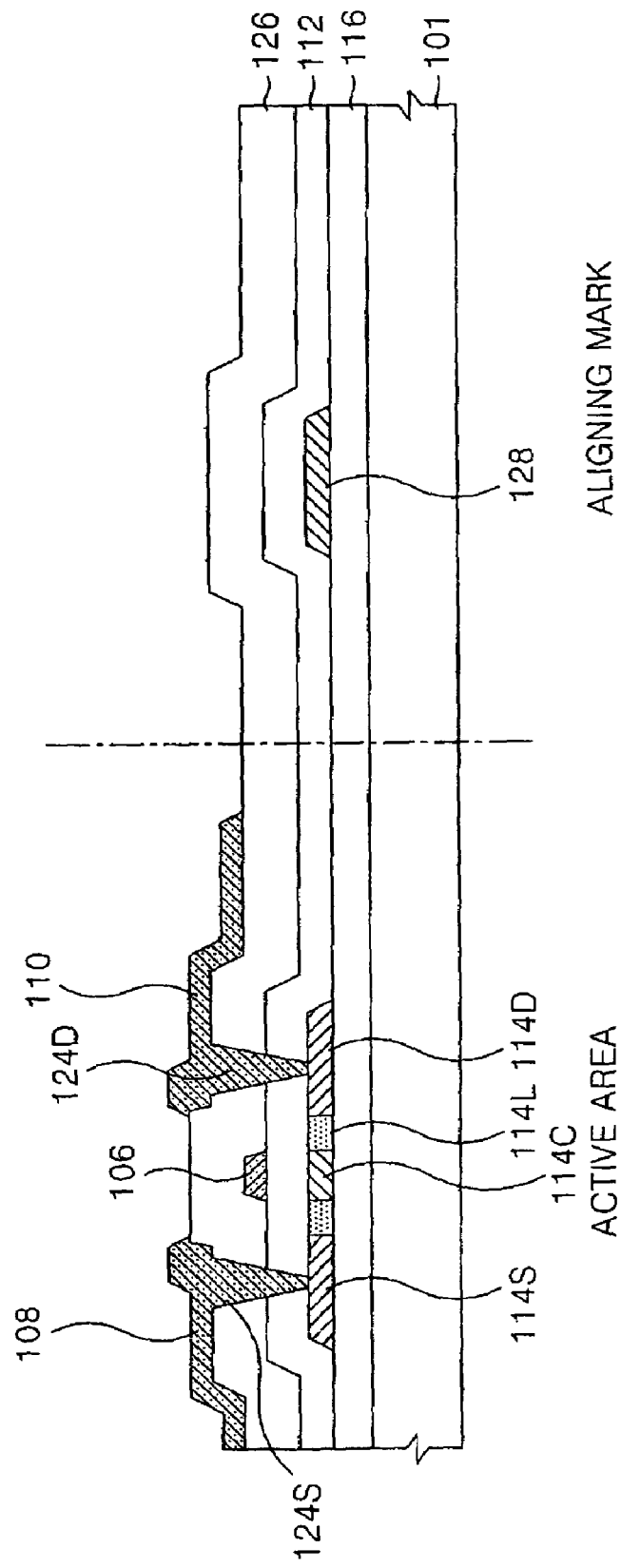

Referring to FIG. 12I, a metal layer is deposited on the entire surface of the interlayer insulating film 126 where the source contact hole 124S and the drain contact hole 124D have been formed. Subsequently, a photo-resist (not shown) is spread on the entire surface of the metal layer. And, a mask is aligned on the photo-resist to define a source electrode 108 and a drain electrode 110. The photo-resist patterns are formed on the metal layer by an exposure and development process. The metal layer is etched with the photo-resist patterns, and the photo-resist patterns are removed. As a result, the source electrode 108 and drain electrode 110 are formed on the lower substrate 101, along with data lines and data pads (not shown) at the same time. The source electrode 108 is connected to the source area 114S of the active layer 114 through the source contact hole 124S. The drain electrode 110 is connected to the drain area 114D of the active layer 114 through the drain contact hole 124D. Next, an inorganic or organic insulating material is formed on the entire surface of the interlayer insulating film 126 to form a protective film 118, wherein the insulating material covers the source electrode 108 and the drain electrode 110. A photo-resist (not shown) is spread on the entire surface of the protective film 118. And, a mask is aligned on the photo-resist to define a pixel contact hole 120. The photo-resist patterns are formed on the protective film 118 through an exposure and development process. The protective film 118 is etched with the photo-resist patterns. As a result, the pixel contact hole 120 that runs through the protective film 118 is formed, with part of the drain electrode 110 being exposed, as illustrated in FIG. 12J.

Figure 12K:
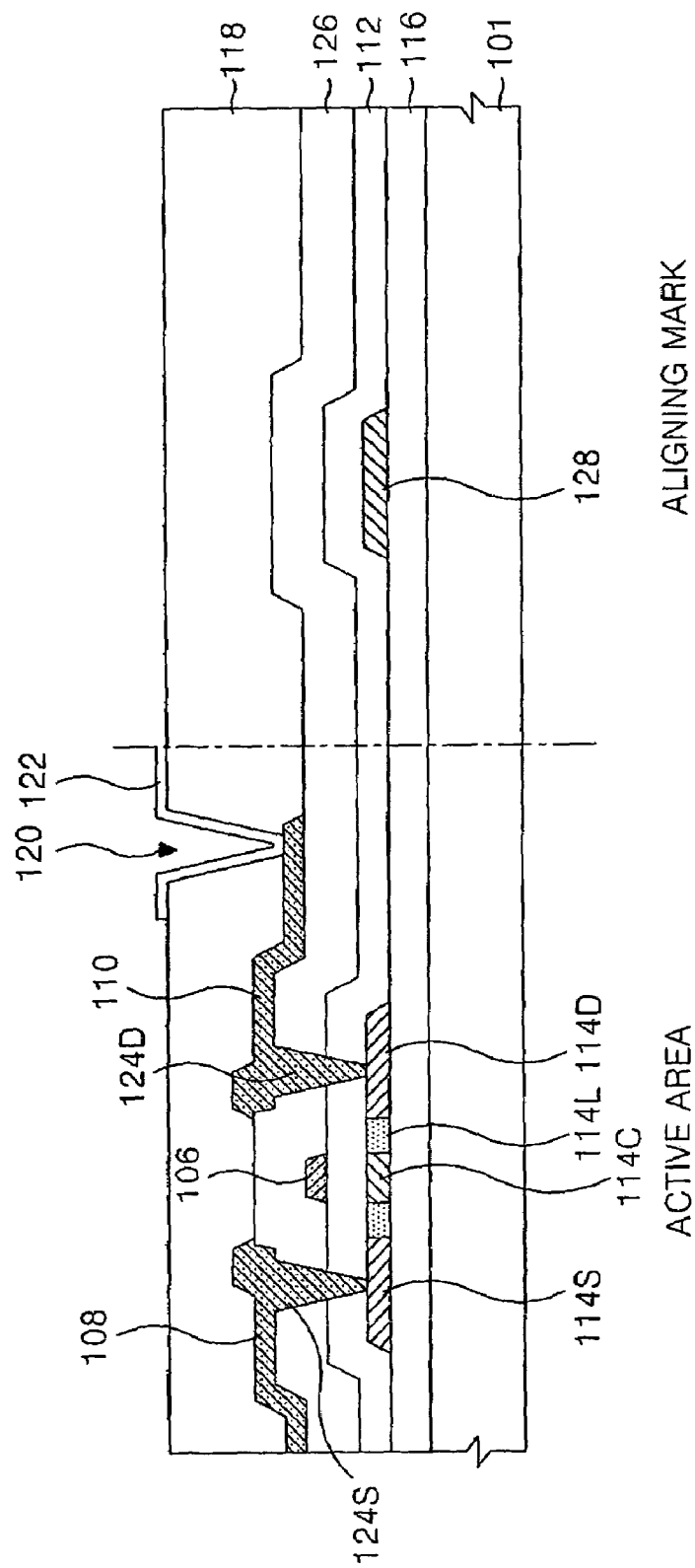

Next, a transparent conductive material, for example, ITO is deposited on the entire surface of the protective film 118 where the pixel contact hole 120 has been formed. A photo-resist (not shown) is spread on the entire surface of the transparent conductive material layer. And, a mask is aligned on the photo-resist to define the pixel electrode 122. The photo-resist patterns are formed on the transparent conductive material layer by an exposure and development process. The transparent conductive material layer is etched with the photo-resist patterns. As a result, the pixel electrode 122 connected to the drain electrode 110 through the pixel contact hole 120 is formed, as illustrated in FIG. 12K.

As described above, the liquid crystal display device and the fabricating method thereof according to the present invention performs a laser annealing using a SLS method only on the portion of the amorphous silicon layer corresponding to the active pattern area and the aligning mark area of the LCD device, thereby transforming amorphous silicon into poly-silicon, and performs an etching in which the poly-silicon region and the amorphous silicon region in the silicon layer are subject to the same etching condition at the same time. As a result, the liquid crystal display device and the fabricating method thereof according to the present invention can form the active pattern and the aligning mark pattern by the etching process without a mask or a photo-resist by taking advantage of the etching rate difference between poly-silicon and amorphous silicon.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A fabricating method of a liquid crystal display device, comprising:
    forming an amorphous silicon on a substrate;
    forming a poly-silicon pattern in the amorphous silicon by partially crystallizing the amorphous silicon; and
    simultaneously etching the amorphous silicon and the poly-silicon pattern using an etching ratio of the amorphous silicon and the poly-silicon pattern to remove the amorphous silicon and leave the poly-silicon pattern on the substrate in absence of a photo-resist.

2. The fabricating method according to claim 1, wherein the poly-silicon pattern is an active layer included in each of a plurality of thin film transistors.

3. The fabricating method according to claim 1, wherein the poly-silicon pattern is an aligning mark.

4. A fabricating method of a liquid crystal display device, comprising:
    forming a buffer layer on a substrate;
    forming an amorphous silicon on the buffer layer;
    forming a poly-silicon pattern by partially irradiating a laser beam on the amorphous silicon and inducing the growth of crystal from the side surface of an area on which the laser beam is irradiated; and
    simultaneously etching the amorphous silicon and the poly-silicon using an etching ratio of the amorphous silicon and the poly-silicon pattern to remove the amorphous silicon and leave the poly-silicon pattern on the substrate in absence of a photo-resist pattern.

5. The fabricating method according to claim 4, wherein the poly-silicon pattern is an active layer included in each of a plurality of thin film transistors.

6. The fabricating method according to claim 4, wherein the poly-silicon pattern is an aligning mark.

7. The fabricating method according to claim 5, further comprising the steps of:
    forming a gate insulating film on the buffer layer to cover the poly-silicon pattern;
    forming a gate electrode of the thin film transistor that partially overlaps with the poly-silicon pattern by forming a gate metal layer on the gate insulating film and patterning the gate metal layer;
    forming a doping area on the poly-silicon pattern by injecting impurities at a low concentration into the poly-silicon pattern other than the part thereof that overlaps with the gate electrode by using the gate electrode as a mask;
    forming a source area and a drain area on the poly-silicon pattern by injecting impurities at a high concentration into part of the doping area;
    forming a interlayer insulating film on the gate insulating film to cover the gate electrode and forming a first contact hole that runs through the interlayer insulating film and the gate insulating film to expose the source area and the drain area;
    forming a source electrode of the thin film transistor connected to the source area and a drain electrode of the thin film transistor connected to the drain area;
    forming a protective film on the interlayer insulating film to cover the source electrode and the drain electrode; and
    forming a second contact hole on the protective film to expose the drain electrode and forming a pixel electrode connected to the drain electrode.

8. A fabricating method of a liquid crystal display device having a plurality of thin film transistors, comprising:
    forming an amorphous silicon layer on a substrate;
    partially crystallizing the amorphous silicon layer using a laser annealing method,
    wherein the partially crystallized silicon layer has a poly-silicon region and an amorphous silicon region; and
    etching the partially crystallized silicon layer to remove the amorphous silicon region and leave the poly-silicon region on the substrate without using a photo-resist pattern.

9. The fabricating method according to claim 8, wherein the laser annealing method is a sequential lateral solidification (SLS) method.

10. The fabricating method according to claim 8, wherein the poly-silicon region is an active layer included in each of the thin film transistors.

11. The fabricating method according to claim 8, wherein the poly-silicon region is an aligning mark.

12. The fabricating method according to claim 8, wherein etching the partially crystallized silicon layer includes subjecting the amorphous silicon region and the poly-silicon region to an etching condition at the same time.

13. The fabricating method according to claim 8, wherein the thin film transistors are a top-gate type.

* * * * *